United States Patent
Tokunaga et al.

(10) Patent No.: US 8,713,806 B2
(45) Date of Patent: *May 6, 2014

(54) POWER TOOL

(75) Inventors: Manabu Tokunaga, Anjo (JP); Shinji Hirabayashi, Anjo (JP); Ryu Hashimoto, Anjo (JP)

(73) Assignee: Makita Corporation, Anjo-shi (JP)

( * ) Notice: Subject to any disclaimer, the term of this patent is extended or adjusted under 35 U.S.C. 154(b) by 377 days.

This patent is subject to a terminal disclaimer.

(21) Appl. No.: 12/996,790

(22) PCT Filed: Jun. 9, 2009

(86) PCT No.: PCT/JP2009/060552
§ 371 (c)(1),
(2), (4) Date: Feb. 25, 2011

(87) PCT Pub. No.: WO2009/151059
PCT Pub. Date: Dec. 17, 2009

(65) Prior Publication Data
US 2011/0138954 A1 Jun. 16, 2011

(30) Foreign Application Priority Data

Jun. 10, 2008 (JP) .............................. 2008-152018
Jun. 10, 2008 (JP) .............................. 2008-152029
Jun. 10, 2008 (JP) .............................. 2008-152044

(51) Int. Cl.
*B23D 45/16* (2006.01)
(52) U.S. Cl.
USPC .................... 30/388; 30/263; 74/343; 74/368
(58) Field of Classification Search
USPC ........... 30/228, 173, 249, 383, 263, 388, 389, 30/390; 74/343, 368
See application file for complete search history.

(56) References Cited

U.S. PATENT DOCUMENTS 1,396,512 A * 11/1921 Fergusson ........................ 74/343
3,713,217 A * 1/1973 Frederick et al. ............... 30/287
(Continued)

FOREIGN PATENT DOCUMENTS

| CN | 1227987 A | 9/1999 |
| CN | 1651808 A | 8/2005 |

(Continued)

OTHER PUBLICATIONS

International Search Report issued in Application No. PCT/JP2009/060552; Dated Jul. 14, 2009 (With Translation).

(Continued)

*Primary Examiner* — Omar Flores Sanchez
(74) *Attorney, Agent, or Firm* — Oliff PLC

(57) ABSTRACT

A power tool includes a power source, a speed change mechanism and a tool bit. The speed change mechanism includes first and second rotating shafts disposed parallel to each other, a first power transmission path provided with a first gear train and a first clutch and a second power transmission path provided with a second gear train and a second clutch. The power transmission path is switched between the first power transmission path and the second power transmission path while the first and second gear trains are held engaged, by shifting of the first and second clutches between the power transmission state and the power transmission interrupted state according to a load applied to the tool bit. The speed change mechanism further includes a switching retaining mechanism, a switching preventing mechanism, a switching set value adjusting mechanism or a switching mechanism.

26 Claims, 28 Drawing Sheets

(56) References Cited

U.S. PATENT DOCUMENTS

| | | | |
|---|---|---|---|
| 3,808,904 A | | 5/1974 | Gotsch et al. |
| 3,858,317 A | * | 1/1975 | Ford et al. ......................... 30/92 |
| 4,710,071 A | * | 12/1987 | Koehler et al. ............... 408/133 |
| 5,239,758 A | * | 8/1993 | Lindell ........................... 30/500 |
| 5,992,257 A | * | 11/1999 | Nemetz et al. ................. 74/371 |
| 7,188,557 B2 | | 3/2007 | Yamada |
| 7,308,948 B2 | | 12/2007 | Furuta |
| 7,854,274 B2 | * | 12/2010 | Trautner et al. ................. 173/48 |
| 7,975,388 B2 | | 7/2011 | Fuchs et al. |
| 8,167,054 B2 | * | 5/2012 | Nakashima et al. ............ 173/48 |
| 8,172,004 B2 | * | 5/2012 | Ho ................................. 173/176 |
| 8,292,001 B2 | * | 10/2012 | Trautner ......................... 173/48 |
| 2007/0240531 A1 | | 10/2007 | Endo et al. |

FOREIGN PATENT DOCUMENTS

| | | |
|---|---|---|
| CN | 1762664 A | 4/2006 |
| CN | 1765590 A | 5/2006 |
| CN | 1720123 B | 5/2012 |
| GB | 2 334 911 A | 9/1999 |
| GB | 2 399 148 A | 9/2004 |
| JP | U-56-54344 | 5/1981 |
| JP | U-62-174151 | 11/1987 |
| JP | B2-01-058031 | 12/1989 |
| JP | A-7-217709 | 8/1995 |
| RU | 2084329 C1 | 7/1997 |
| SU | 210043 | 1/1968 |

OTHER PUBLICATIONS

Feb. 3, 2012 Extended European Search Report issued in European Patent Application No. 09762489.4.

May 6, 2013 Office Action issued in Russian Patent Application No. RU 2010153880 w/translation.

Office Action dated Oct. 26, 2012 issued in Chinese Patent Application No. 200980121597.2 (with translation).

* cited by examiner (A)

(B)

(A)

(B)

(A)

(B)

POWER TOOL

FIELD OF THE INVENTION

The invention relates to a parallel-shaft type speed change mechanism for a power tool.

BACKGROUND OF THE INVENTION

Japanese patent publication No. 1989-58031 discloses a power tool having a parallel-shaft type speed change mechanism. The known parallel-shaft type speed change mechanism has first and second drive gears having different numbers of teeth and fixed on a drive shaft, and first and second driven gears having different numbers of teeth and mounted on a driven shaft parallel to the drive shaft such that the driven gears are movable in the longitudinal direction. The first and second driven gears to be engaged with the first and second drive gears can be shifted by sliding the first and second driven gears along the driven shaft so that the speed of a motor can be changed to two speeds, or high speed and low speed, and transmitted to the tool bit.

According to the above-mentioned known parallel-shaft type speed change mechanism, when the position of the driven gears with respect to the drive gears is changed for speed change, it is difficult to smoothly engage the drive gears with the driven gears. In this connection, further improvement is desired in smoothness of speed changing operation.

SUMMARY OF THE INVENTION

Accordingly it is an object of the invention to improve smoothness of speed changing operation in a power tool having a parallel-shaft type speed change mechanism.

Above described object can be achieved by the claimed invention in which a representative power tool includes a power source and a speed change mechanism. A tool bit is driven via the speed change mechanism by the power source and caused to perform a predetermined operation. The "power tool" in this invention widely includes various kinds of power tools, such as a circular saw or electric cutter for woodworking or metalworking which performs a cutting operation on a workpiece by a rotating saw blade, a sander which performs grinding or polishing operation on a workpiece by a rotating sanding disc, a diamond core drill for drilling a relatively large-diameter hole, and a hedge trimmer for trimming a hedge by reciprocating upper and lower blades in opposite directions.

According to an aspect of the invention, the speed change mechanism is provided to include first and second rotating shafts disposed parallel to each other, and first and second gear trains having different gear ratios and each having a combination of a drive gear and a driven gear as one unit which are engaged with each other and transmit torque of the first rotating shaft to the second rotating shaft. A torque transmission path via the first gear train is defined as a first power transmission path and a torque transmission path via the second gear train is defined as a second power transmission path. The power tool further includes a first clutch which allows and interrupts power transmission on the first power transmission path and a second clutch which allows and interrupts power transmission on the second power transmission path. Further, the power transmission path is switched between the first and second power transmission paths while the first and second gear trains are held engaged, by shifting of the first and second clutches between the power transmission state and the power transmission interrupted state according to a load applied to the tool bit.

The "power source" in this invention typically represents an electric motor, but it also suitably includes other motors such as an air motor and an engine. Further, the manner in which "the power transmission path is switched between the first and second power transmission paths while the first and second gear trains are held engaged" in this invention represents the manner in which the power transmission path is switched between the first and second power transmission paths while the position of the gears engaged with each other is fixed, or specifically, the manner in which, when one clutch is shifted to the power transmission state, the other clutch is shifted to the power transmission interrupted state, and when one clutch is shifted to the power transmission interrupted state, the other clutch is shifted to the power transmission state. One of the first and second power transmission paths is typically defined as a high-speed low-torque power transmission path and the other as a low-speed high-torque power transmission path.

According to the invention, the power transmission path can be switched between the first and second power transmission paths while the gear trains in engagement are fixed in position. Therefore, speed changing operation can be performed with increased smoothness.

Particularly, in the case of a construction in which gears to be engaged are shifted for speed change by sliding gears along a shaft, like the known speed change mechanism, a rattle may be caused due to a clearance between mating surfaces of the shaft and the gears, so that wear is easily caused and the gears have a problem in durability. Further, during shift of engagement of the gears, on the verge of disengagement of the gears and in the early stage of engagement of the gears, a very small area of a tooth face is subjected to torque, so that a problem in strength, such as chipping and wear of the teeth, arises. Further, when the gears are engaged, noise may also be caused due to interference of the teeth. According to this invention, however, with the construction in which the gears are normally engaged, the above-mentioned problems of the known technique in which the gears to be engaged are shifted can be solved.

Further, the gear ratio (speed reduction ratio) of the first gear train forming a component of the first power transmission path is different from the gear ratio of the second gear train forming a component of the second power transmission path in this invention. Therefore, for example, when a load applied to the tool bit is low, the operation can be performed at high speed and low torque, for example, by using the first power transmission path having a small gear ratio. On the other hand, when the load applied to the tool bit is high, the operation can be performed at low speed and high torque by using the second power transmission path having a high gear ratio.

According to the other aspect of the invention, it is characterized in that the speed change mechanism includes a switching retaining mechanism, and when the power transmission path is switched between the first and second power transmission paths, the switching retaining mechanism retains the shifted state until the power source is stopped. In a speed change mechanism in which the power transmission path is automatically switched from the first power transmission path to the second power transmission path according to the load applied to the tool bit, if the load applied to the tool bit fluctuates around a switching set value, switching between the first power transmission path and the second power transmission path is frequently effected.

According to this aspect, once the power transmission path is switched between the first power transmission path and the second power transmission path, the switching retaining mechanism retains the shifted state. Thus, even if the load applied to the tool bit is reduced thereafter, the power transmission path is never switched again. Therefore, the problems of adversely affecting wear resistance and causing vibration due to frequent switching can be solved.

According to a further aspect of the invention, at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other. Further, the switching retaining mechanism includes a latching member, and when the drive side clutch member or the driven side clutch member is moved to the power transmission interrupted position, the latching member is engaged with the moved sliding side clutch member and thereby retains the sliding side clutch member in the power transmission interrupted state.

According to this aspect, when the sliding side clutch member is moved to the power transmission interrupted position, the sliding side clutch member can be retained in the power transmission interrupted position by the latching member so that the power transmission interrupted state of the clutch can be ensured.

In a construction in which the clutch is shifted between the power transmission position and the power transmission interrupted position according to the load applied to the tool bit, if the load applied to the tool bit fluctuates around a switching set value, the clutch is frequently shifted, which may adversely affect durability or cause vibration in the power tool. According to this aspect, however, the above problems can be solved by retaining the clutch in the power transmission interrupted state by the latching member.

According to a further aspect of the power tool of the invention, a recess is formed in a side of the sliding side clutch member. The latching member is fixed to the first or second rotating shaft and housed in the recess such that the latching member cannot move in a circumferential direction with respect to the recess, and thereby transmits torque between the first or second rotating shaft and the sliding side clutch member. Further, when the sliding side clutch member is moved to the power transmission interrupted state, the latching member is moved out of the recess by the movement of the sliding side clutch member, and moved with respect to the sliding side clutch member in a direction of rotation due to a difference in the rotation speed between the sliding side clutch member and the latching member which is caused by the movement out of the recess, and thus engaged with a side of the sliding side clutch member and thereby retains the sliding side clutch member in the power transmission interrupted position.

The "latching member" according to the invention is typically shaped to have a plurality of protrusions for torque transmission which protrude radially outward on its outer circumferential surface and are equiangularly spaced apart from each other in the circumferential direction. It may however be shaped otherwise only if it is allowed to transmit torque between the first or second rotating shaft and the sliding side clutch member. Further, the "difference in the rotation speed between the sliding side clutch member and the latching member which is caused by the movement out of the recess" in this invention represents the difference in the rotation speed which is caused between the first or second rotating shaft and the sliding side clutch member as a result that the latching member is moved out of the recess and can no longer transmit torque between the first or second rotating shaft and the sliding side clutch member.

According to this aspect, when the sliding side clutch member is moved to the power transmission interrupted position and the clutch is shifted to the power transmission interrupted state, the latching member is engaged with the side of the sliding side clutch member moved to the power transmission interrupted position and can thereby retain the sliding side clutch member in the power transmission interrupted position. Particularly, in this invention, the latching member also serves to transmit torque between the first or second rotating shaft and the sliding side clutch member, so that the number of parts can be reduced and the structure can be made simpler.

According to a further aspect of the invention, the power tool includes a gear housing that houses the speed change mechanism. Further, an engagement part is formed on an outer circumferential surface of the sliding side clutch member. The switching retaining mechanism includes a latching member which is radially movably disposed in the gear housing and comes in contact with the outer circumferential surface of the sliding side clutch member from the radial direction, and a biasing member that biases the latching member in a direction of engagement with the sliding side clutch member. When the sliding side clutch member is moved to the power transmission interrupted position, the latching member is engaged with the engagement part and thereby retains the moved sliding side clutch member in the power transmission interrupted position. The "engagement part" in this invention typically comprises a radial wall surface on the outer circumferential surface of the sliding side clutch member which is stepped in the longitudinal direction. The "latching member" according to the invention preferably comprises a sphere or a columnar body having a spherical end surface. Further, the "biasing member" in this invention typically comprises a spring, but it also suitably includes rubber.

According to this aspect, the latching member and the biasing member which form the switching retaining mechanism are disposed within the gear housing, so that the sliding side clutch member can have a simpler shape.

According to a further aspect of the invention, the power tool includes a reset mechanism that returns the switching retaining mechanism to an initial position when the power source is stopped. According to this aspect, by provision of the reset mechanism, the speed change mechanism can be properly driven when the power source is restarted.

According to a further aspect of the invention, when a brake is applied to the power source in order to stop the power source, the latching member is returned to the recess due to a difference in the rotation speed which is caused between the sliding side clutch member and the latching member. Specifically, in this invention, the power source typically comprises a motor with a brake, and by provision of the reset mechanism utilizing the brake of the motor, the latching member can be rationally reset to the initial position.

According to a further aspect of the invention, the power tool includes a power tool body that houses the power source and the speed change mechanism, and a base which is disposed below the power tool body and can be placed on a workpiece. The tool bit comprises a saw blade which is rotationally driven via the speed change mechanism by the power source and thereby cuts the workpiece.

According to this aspect, a cutting tool can be provided with a parallel-shaft type speed change mechanism which can more smoothly perform speed changing operation. For example, in a cutting tool such as a circular saw, if the power transmission path is frequently switched and the rotation speed of the saw blade is frequently changed during cutting operation, a cutting face of the workpiece may be adversely affected. According to this aspect, however, once the speed is changed, the changed state is retained, so that the adverse effect on the cutting face can be avoided.

According to another aspect of the invention as a preferred modification of the representative power tool, it is characterized in that the speed change mechanism further includes a switching preventing mechanism which prevents the power transmission path from switching between the first and second power transmission paths by inertia of the tool bit at the time of startup of the power source. The "inertia of the tool bit" in this invention represents inertia of the tool bit at rest. In the case of a speed change mechanism in which the power transmission path is automatically switched from the first power transmission path to the second power transmission path according to the load applied to the tool bit, when the tool bit has great inertia, it may malfunction at the time of startup of the power source.

By provision of the switching preventing mechanism which prevents the power transmission path from switching between the first and second power transmission paths by inertia of the tool bit, the power transmission path can be prevented from being accidentally switched by inertia of the tool bit at the time of startup of the power source. Therefore, it can be made ready for operation by rapidly increasing its rotation speed of the power source to a specified speed, so that the operation efficiency can be effectively enhanced.

According to a further aspect of the invention, at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other. Further, the switching preventing mechanism includes an engagement part which is formed on the first or second rotating shaft, and a movement preventing member which is radially movably formed on the sliding side clutch member. When the power source is in the stopped state and the sliding side clutch member is placed in the power transmission position, the movement preventing member prevents the clutch member from moving from the power transmission position to the power transmission interrupted position by engagement with the engagement part. Specifically, according to this invention, when the power source is in the stopped state, the movement preventing member is engaged with the engagement part of the first or second rotating shaft and thereby prevents the sliding side clutch member from moving. Thus, the sliding side clutch member can be prevented from being accidentally shifted by inertia of the tool bit at the time of startup of the power source. The "engagement part" in this invention typically comprises an annular groove which is formed in the rotating shaft in the circumferential direction. Further, the manner of "engagement" in this invention typically represents surface contact.

Further, according to the invention, after the power source is started, the movement preventing member is moved radially outward by centrifugal force acting upon the movement preventing member and thus disengaged from the engagement part, thereby allowing the sliding side clutch member to move from the power transmission position to the power transmission interrupted position. Thus, after the power source is started, the sliding side clutch member prevented from moving by the movement preventing member is released, so that the sliding engagement clutch can normally operate according to the load applied to the tool bit.

According to a further aspect of the invention, the first rotating shaft is defined as a drive side rotating shaft and the second rotating shaft is defined as a driven side rotating shaft, and the sliding engagement clutch and the switching preventing mechanism are disposed on the drive side rotating shaft. If the engagement part formed on the rotating shaft comprises an annular groove, the diameter of the rotating shaft is reduced at the region of the groove, so that the strength of this region is reduced. Therefore, it is more effective in improving the durability if the groove is formed in the drive side rotating shaft which is subjected to lower torque, rather than in the driven side rotating shaft which is subjected to higher torque.

According to a further aspect of the invention, three such movement preventing members are formed on the sliding side clutch member and equiangularly spaced apart from each other in a circumferential direction. In the state in which the movement preventing members prevent movement of the sliding side clutch member by engagement with the engagement part, the engagement part is subjected to a force to be applied to the sliding side clutch member in the longitudinal direction via the movement preventing members. Therefore, the sliding side clutch member may tilt (with respect to the first or second intermediate shaft). According to this aspect, by provision of the three movement preventing members spaced equiangularly apart from each other in the circumferential direction on the sliding side clutch member, occurrence of such tilt can be prevented. The manner of being "equiangularly spaced apart from each other in a circumferential direction" includes the manner of being generally equiangularly spaced apart from each other.

According to a further aspect of the invention, the power tool further includes a gear housing that houses the speed change mechanism, and the switching preventing mechanism includes an electromagnetic solenoid mounted on the gear housing, and a movement preventing member which is moved by the electromagnetic solenoid and prevents the sliding side clutch member from moving from the power transmission position to the power transmission interrupted position by engagement with the sliding side clutch member when the power source is in the stopped state. When a predetermined time elapses since the power source is started, the electromagnetic solenoid is energized to move the movement preventing member in a direction of disengagement from the sliding side clutch member and thereby allows the sliding side clutch member to move from the power transmission position to the power transmission interrupted position. The time "when a predetermined time elapses" in this invention represents the time when the inertia which acts in a direction to hold the tool bit at rest is reduced, as the tool bit rotates, to such an extent that the sliding clutch member can no longer be shifted by the inertia. This time can be appropriately set, for example, by utilizing a microcomputer, e.g. to the time when a predetermined time elapses since the power source is started, or the time when a rotation sensor detects that the rotation speed of the power source or the tool bit is increased to a predetermined speed.

Therefore, according to the invention constructed as described above, by provision of the switching preventing mechanism having the electromagnetic solenoid and the movement preventing member which is moved by the electromagnetic solenoid, the sliding engagement clutch can be prevented from malfunctioning by inertia of the tool bit at the time of startup of the motor. Therefore, the power source can be made ready for operation by rapidly increasing its rotation speed to a rotation speed, so that the operation efficiency can be effectively enhanced. Further, after the power source is started, the sliding side clutch member is allowed to move, so that the sliding engagement clutch can normally operate according to the load applied to the tool bit.

Further, in a method of preventing switching of the sliding clutch member by utilizing the electromagnetic solenoid, the electromagnetic solenoid can also be used in the manner in which automatic transmission is prevented (disabled) by controlling the electromagnetic solenoid such that the prevented state can be maintained not only at the time of startup of the power source, but also after it is started. Specifically, the electromagnetic solenoid can also be used in the manner in which the tool bit is driven by using only the first or second transmission path.

According to a further aspect of the invention, the power source comprises a motor. Further, the switching preventing mechanism comprises a motor control device having a soft starting function of controlling such that the rotation speed of the motor gradually increases at the time of startup of the motor. By provision of such a construction, the inertial torque can be reduced by gradually increasing the rotation speed of the motor or the rotation speed of the tool bit at the time of startup of the motor, the power transmission path of the speed change mechanism can be prevented from being accidentally shifted at the time of startup of the motor.

According to a further aspect of the invention, the power tool includes a power tool body that houses the power source and the speed change mechanism, and a base which is disposed below the power tool body. Further, the tool bit comprises a saw blade which is rotationally driven via the speed change mechanism by the power source and thereby cuts the workpiece.

According to this aspect, a cutting tool can be provided with a parallel-shaft type speed change mechanism which can more smoothly perform speed changing operation. In the case of a cutting tool such as a circular saw, it is preferable to drive the saw blade at high speed in order to obtain a smooth cut face, and moreover, it is preferable to drive the saw blade at high torque when a load applied to the saw blade is increased, for example, due to increase of the cutting depth of the saw blade with respect to the workpiece as the cutting operation proceeds. According to this aspect, a cutting tool can be provided which can change the rotation speed of the saw blade according to such operating conditions.

Further, according to another preferred embodiment of the representative power tool according to the invention, it is characterized in that the speed change mechanism includes a switching set value adjusting mechanism which is operated by a user and adjusts a switching set value at which the transmission path is switched between the first power transmission path and the second power transmission path. The "switching set value" in this invention typically represents a maximum torque value or an interrupting torque value which can be transmitted by the clutch disposed in the first or second power transmission path. According to this invention, in which the switching set value can be adjusted, the torque transmission path can be switched at a timing appropriate to the needs of the user.

Further, according to another embodiment of the representative power tool according to the invention, it is characterized in that the speed change mechanism includes a mode switching mechanism which is operated by a user and switches the transmission mode between a first transmission mode in which a torque transmission path is automatically switched between the first power transmission path and the second power transmission path according to the load applied to the tool bit, and at least one of a second transmission mode in which the first power transmission path is used for torque transmission and a third transmission mode in which the second power transmission path is used for torque transmission. Switching the transmission mode by the mode switching mechanism is typically done before operation, but it may be possibly done during operation.

According to this aspect, the user can switch between the first transmission mode and at least one of the second transmission mode and the third transmission mode, according to the magnitude of the load during operation which varies, for example, by the kind of workpiece, or according to the presence or absence of the fluctuations of the load, so that the convenience can be improved. Specifically, operation can be performed in accordance with the purpose, either by selecting the automatic transmission mode in which the transmission path is automatically switched between the high-speed and low-torque path and the low-speed and high-torque path, or by selecting at least one of the high speed mode in which the tool bit is driven at high speed and low torque and the low speed mode in which it is driven at low speed and high torque.

Further, according to a further aspect of the invention, the speed change mechanism may further include a switching set value adjusting mechanism which is operated by a user and adjusts a switching set value at which the transmission path is switched between the first power transmission path and the second power transmission path in the state in which the mode switching mechanism is placed in the first transmission mode.

According to a further aspect of the invention, at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other. The sliding engagement clutch further includes an elastic member. The elastic member biases the sliding side clutch member to the power transmission position, and the switching set value is defined by a biasing force of the elastic member. When a load exceeding the switching set value is applied to the sliding side clutch member, the sliding side clutch member moves from the power transmission position to the power transmission interrupted position against the biasing force of the elastic member. The switching set value adjusting mechanism includes an adjusting member for adjusting the biasing force of the elastic member.

The "elastic member" in this invention typically represents rubber, and a compression coil spring or a disc spring can be suitably used. Further, the "adjusting member" in this invention is typically disposed on the gear housing that houses the speed change mechanism and can move one end of the elastic member in the longitudinal direction by operation of the user so that the biasing force of the elastic member is increased or decreased.

According to this aspect, the switching set value can be easily adjusted by changing the biasing force of the elastic member by the adjusting member.

According to a further aspect of the invention, the switching set value can be steplessly adjusted. With such a construction, fine adjustment of the switching set value can be realized.

According to a further aspect of the invention, the power tool includes a power tool body that houses the power source and the speed change mechanism, and a base which is disposed below the power tool body and can be placed on a workpiece. The tool bit comprises a saw blade which is rotationally driven via the speed change mechanism by the power source and thereby cuts the workpiece.

According to this aspect, a cutting tool can be provided with a parallel-shaft type speed change mechanism which can more smoothly perform speed changing operation.

According to the invention, smoothness of speed changing operation is improved within a power tool having a parallel-shaft type speed change mechanism.

BRIEF DESCRIPTION OF THE DRAWINGS

FIG. 11 illustrates the movement of the sliding engagement clutch, in which FIG. 11(A) shows the movement of cams and FIG. 11(B) shows the movement of the torque ring provided as a latching member.

DETAILED DESCRIPTION OF THE REPRESENTATIVE EMBODIMENT OF THE INVENTION

First Embodiment of the Invention

Figure 1:
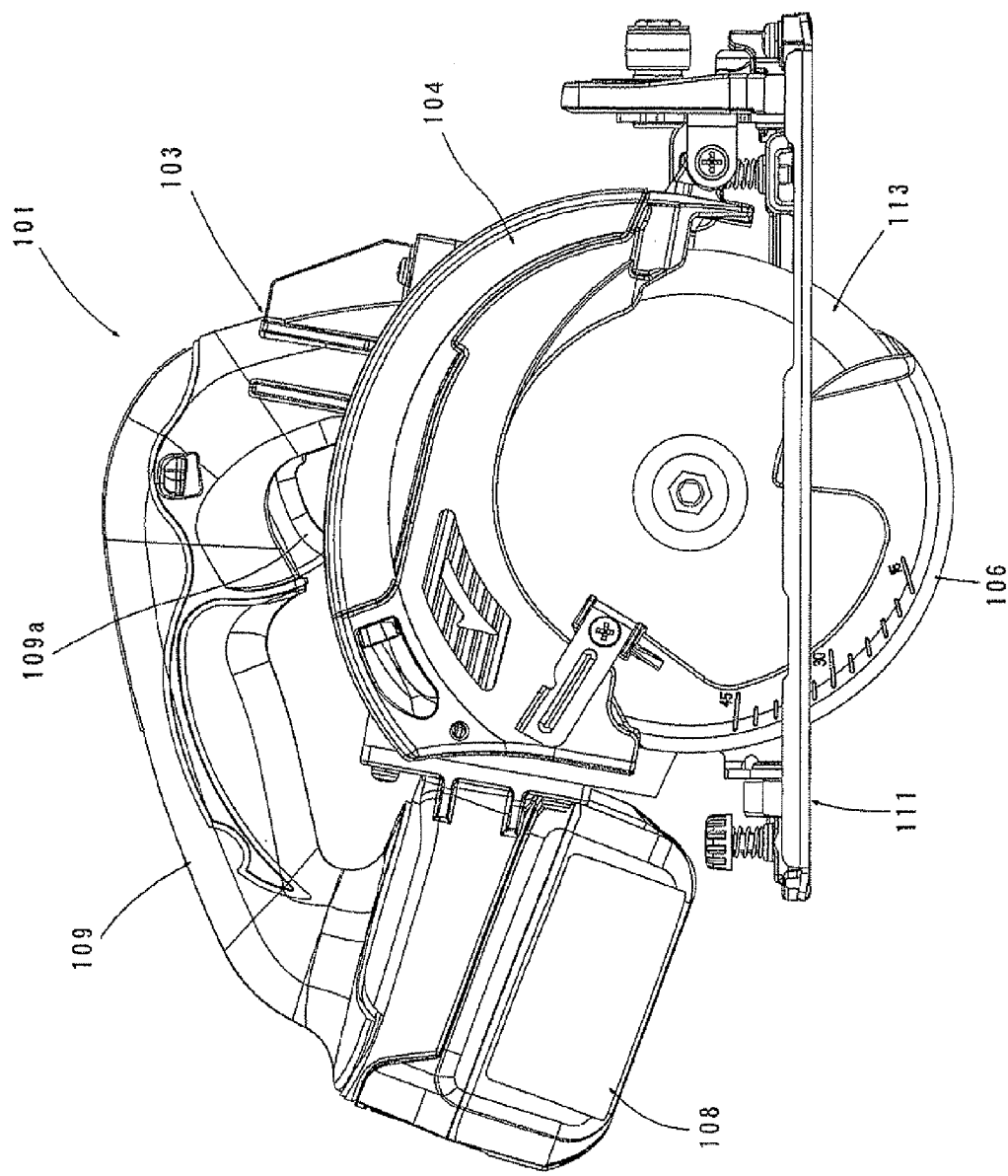
FIG. 1 is a side view showing an entire circular saw according to a first embodiment of the invention.
Figure 2:
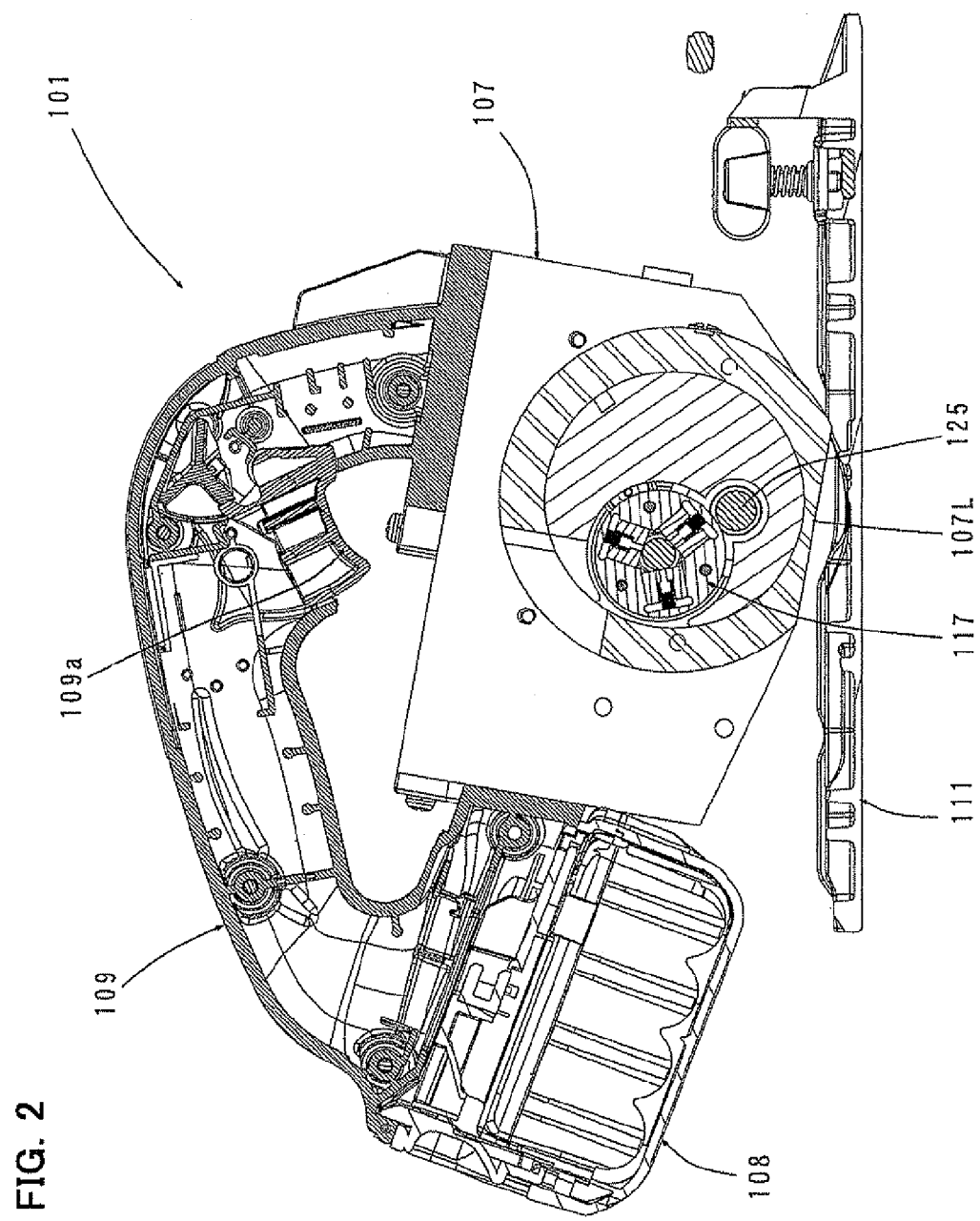
FIG. 2 is a sectional side view of the entire circular saw.
Figure 3:
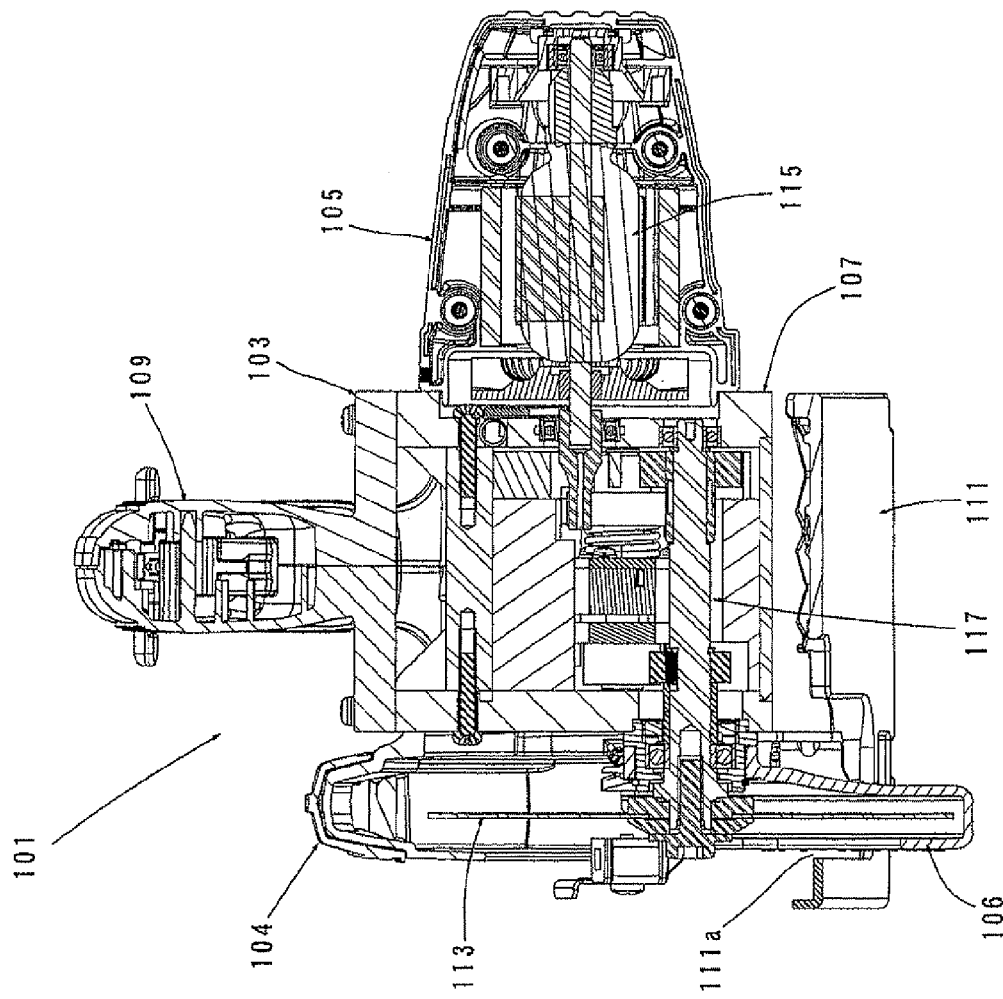
FIG. 3 is a sectional front view of the entire circular saw.

A first embodiment of the invention is now explained with reference to the drawings. A battery-powered circular saw having a battery is now explained as a representative embodiment of the power tool according to the invention. FIG. 1 is a side view showing an entire circular saw 101 according to this embodiment. FIG. 2 is a sectional side view of the entire circular saw 101. FIG. 3 is a sectional front view of the entire circular saw 101. As shown in FIGS. 1 to 3, the circular saw 101 according to this embodiment includes a base 111 which can be placed on a workpiece (not shown) and moved in a cutting direction, and a circular saw body 103 disposed above the base 111. The circular saw body 103 is a feature that corresponds to the "power tool body" according to this invention.

The circular saw body 103 mainly includes a blade case 104 that covers substantially an upper half of a disc-like blade (saw blade) 113 which is rotated in a vertical plane, a motor housing 105 that houses a driving motor 115, a gear housing 107 that houses a speed change mechanism 117, and a handgrip 109 which is held by a user to operate the circular saw 101. The blade 113 and the driving motor 115 are features that correspond to the "tool bit" and the "power source", respectively, according to this invention.

Figure 4:
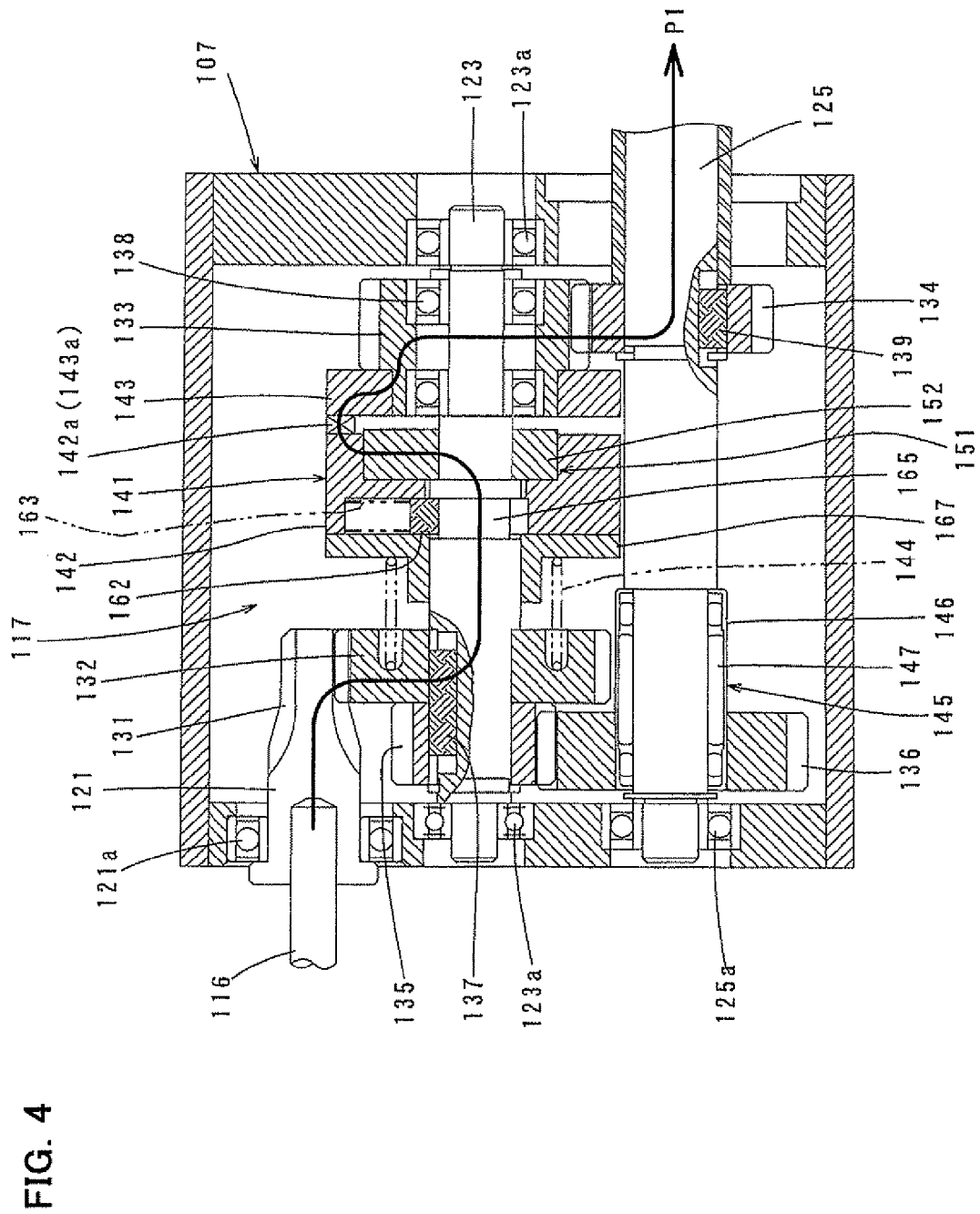
FIG. 4 is a developed sectional view of a parallel three-shaft type speed change mechanism in the state in which a power transmission path is switched to a high-speed low-torque path.
Figure 5:
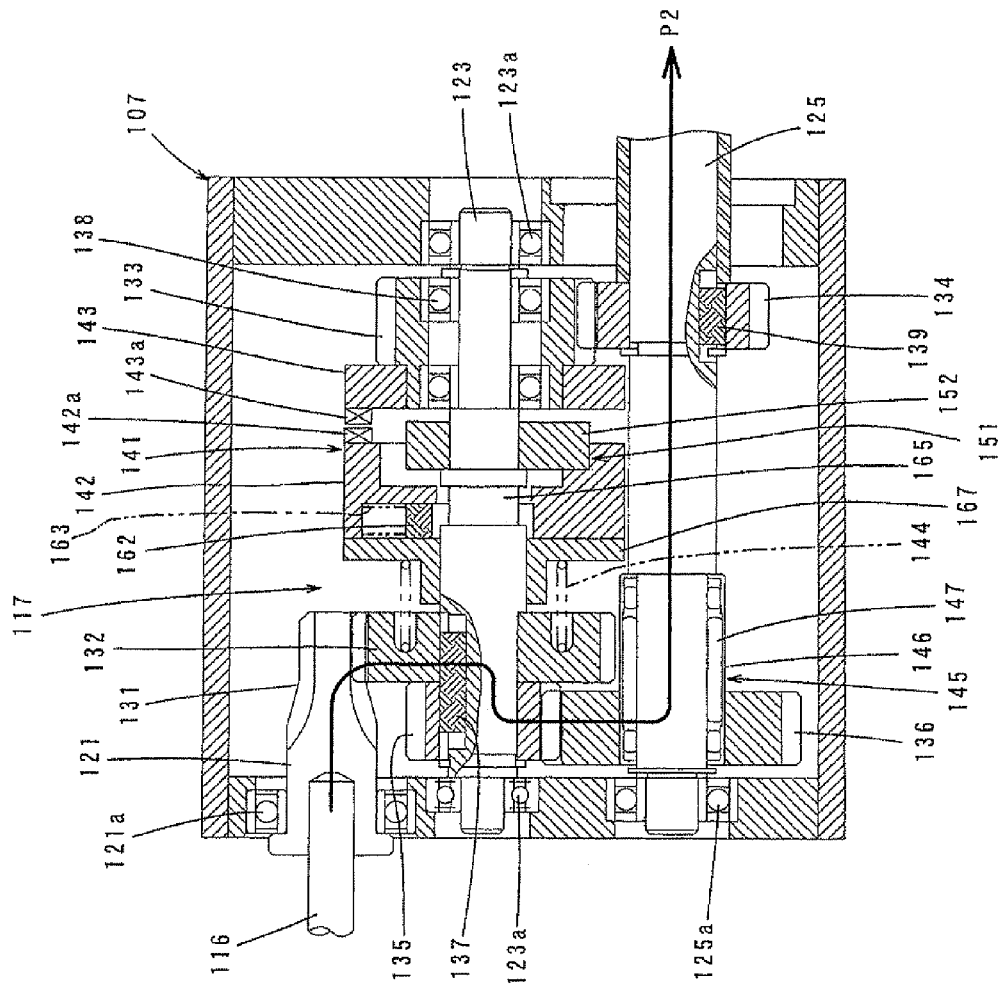
FIG. 5 is a developed sectional view of the parallel three-shaft type speed change mechanism in the state in which the power transmission path is switched to a low-speed high-torque path.

The speed change mechanism 117 is now explained with reference to FIGS. 4 and 5. The speed change mechanism 117 according to this embodiment is of a parallel three-shaft type having three shafts disposed parallel to each other, i.e. an input shaft 121 which is coaxially connected to a motor shaft 116 of the driving motor 115, an output shaft in the form of a blade mounting shaft 125 onto which the blade 113 is fitted, and an intermediate shaft 123 disposed between the input shaft 121 and the blade mounting shaft 125. The speed change mechanism 117 is of the two-stage switching type in which a power transmission path can be automatically switched between a high-speed low-torque path and a low-speed high-torque path according to the magnitude of load applied to the blade 113. The intermediate shaft 123 is a feature that corresponds to the "first rotating shaft" and the "upstream shaft", and the blade mounting shaft 125 corresponds to the "second rotating shaft" and the "output shaft", according to this invention. FIGS. 4 and 5 are developed sectional views of the parallel three-shaft type speed change mechanism 117. FIG. 4 shows the state in which the power transmission path is switched to the high-speed low-torque path, and FIG. 5 shows the state in which the power transmission path is switched to the low-speed high-torque path. In the following description, the blade mounting shaft 125 is referred to as the output shaft.

The speed change mechanism 117 includes a first power transmission path P1 through which torque of the input shaft 121 is transmitted from a pinion gear 131 to the output shaft 125 via a first intermediate gear 132, the intermediate shaft 123, a second intermediate gear 133 and a first driven gear 134, and a second power transmission path P2 through which torque of the input shaft 121 is transmitted from the pinion gear 131 to the output shaft 125 via the first intermediate gear 132, the intermediate shaft 123, a third intermediate gear 135 and a second driven gear 136. The gear ratio (speed reduction ratio) between the second intermediate gear 133 and the first driven gear 134 is designed to be lower than the gear ratio (speed reduction ratio) between the third intermediate gear 135 and the second driven gear 136. Therefore, the first power transmission path P1 forms a high-speed low-torque power transmission path, and the second power transmission path P2 forms a low-speed high-torque power transmission path. The first and second power transmission paths P1, P2 are shown by bold arrowed line. The second intermediate gear 133 and the first driven gear 134 form the "first gear train" according to the invention, and the third intermediate gear 135 and the second driven gear 136 form the "second gear train" according to the invention.

The input shaft 121, the intermediate shaft 123 and the output shaft 125 in the speed change mechanism 117 are rotatably supported by the gear housing 107 via bearings 121*a*, 123*a*, 125*a*, respectively. A drive gear in the form of the pinion gear 131 is integrally formed on the input shaft 121. The first intermediate gear 132 and the third intermediate gear 135 are disposed side by side on one end region (on the driving motor 115 side or the left side as viewed in the drawing) of the intermediate shaft 123 and integrated with the intermediate shaft 123 via a common key 137. The first intermediate gear 132 is normally engaged with the pinion gear 131, and the third intermediate gear 135 is normally engaged with the second driven gear 136 provided on one end region of the output shaft 125. The second intermediate gear 133 is mounted for relative rotation on the other end region (on the blade 113 side or the right side as viewed in the drawing) of the output shaft 125 via a bearing 138 and normally engaged with the first driven gear 134. The first driven gear 134 is disposed on the other end region of the output shaft 125 and integrated with the output shaft 125 via a key 139.

In the circular saw 101 according to this embodiment, in an initial stage of a cutting operation of cutting a workpiece by the blade 113 in which the load applied to the blade 113 is relatively small, the output shaft 125 or the blade 113 is rotationally driven via the high-speed low-torque first power transmission path P1. Thereafter, when the load applied to the blade 113 reaches a predetermined value as the cutting operation proceeds, it is automatically switched to the low-speed high-torque second power transmission path P2. Such switching from the first power transmission path P1 to the second power transmission path P2 is realized by providing a sliding engagement clutch 141 on the intermediate shaft 123 and a one-way clutch 145 on the output shaft 125. The sliding engagement clutch 141 and the one-way clutch 145 are features that correspond to the "first and second clutches", respectively, according to the invention.

Figure 6:
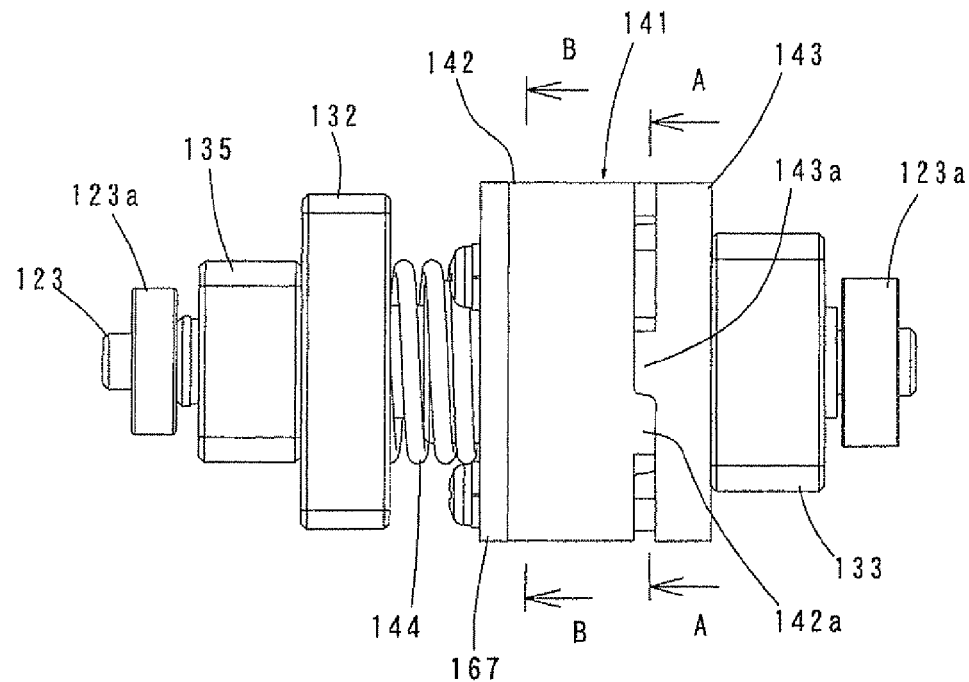
FIG. 6 is an external view of a sliding engagement clutch.
Figure 7:
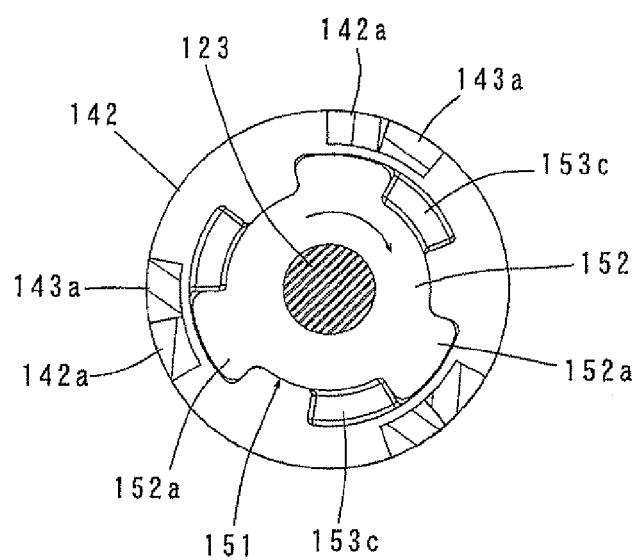
FIG. 7 is a sectional view taken along line A-A in FIG. 6.
Figure 8:
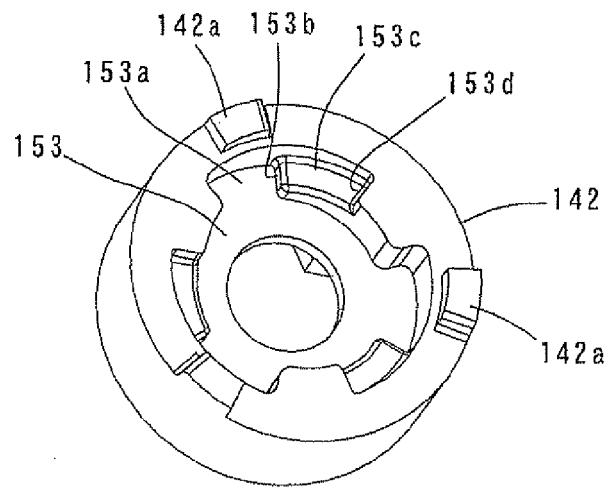
FIG. 8 is a perspective view showing a drive side clutch member in the sliding engagement clutch.
Figure 9:
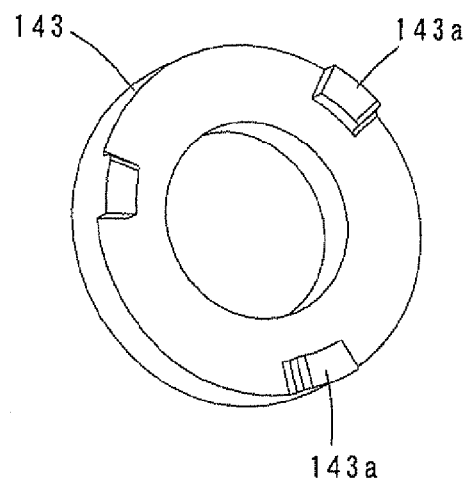
FIG. 9 is a perspective view showing a driven side clutch member in the sliding engagement clutch.
Figure 10:
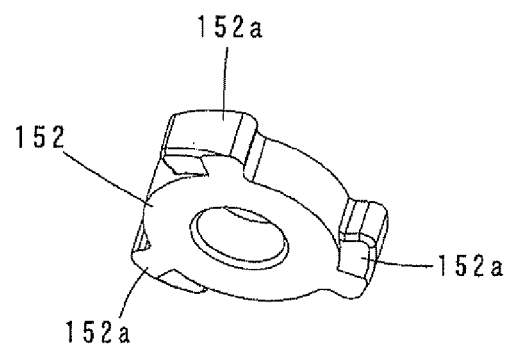
FIG. 10 is a perspective view showing a torque ring in the sliding engagement clutch.

The construction of the sliding engagement clutch 141 is shown in FIGS. 6 to 10 as well as FIGS. 4 and 5. FIG. 6 is an external view of the sliding engagement clutch 141 and FIG. 7 is a sectional view taken along line A-A in FIG. 6. FIG. 8 shows a drive side clutch member 142, FIG. 9 shows a driven side clutch member 143, and FIG. 10 shows a torque ring 152. As shown in FIG. 6, the sliding engagement clutch 141 mainly includes the drive side clutch member 142 and the driven side clutch member 143 which face each other in the axial direction of the intermediate shaft 123, and a clutch spring 144 which presses and biases the drive side clutch member 142 toward the driven side clutch member 143. As shown in FIGS. 8 and 9, the drive side clutch member 142 and the driven side clutch member 143 have a plurality of (for example, three) generally trapezoidal cams 142*a*, 143*a*, respectively, in the circumferential direction on the respective sides facing each other. Torque is transmitted when the cams 142*a*, 143*a* are engaged with each other (see FIGS. 4 and 6), while the torque transmission is interrupted when the cams 142*a*, 143*a* are disengaged from each other (see FIG. 5).

The drive side clutch member 142 is loosely fitted onto the intermediate shaft 123. Specifically, the drive side clutch member 142 is mounted onto the intermediate shaft 123 such that it can slide with respect to the intermediate shaft 123 in the circumferential direction and the axial direction. The drive side clutch member 142 is rotationally driven via a torque transmission member in the form of the torque ring 152 which is press-fitted onto the intermediate shaft 123. As shown in FIG. 10, the torque ring 152 has a plurality of (three) torque transmission parts in the form of protrusions 152*a* which protrude radially outward and are evenly spaced in the circumferential direction. A housing space 153 is formed in a side of the drive side clutch member 142 on which the cams 142*a* are formed, and has a shape generally corresponding to the contour of the torque ring 152. The torque ring 152 is housed in the housing space 153 such that the torque ring 152 cannot move in the circumferential direction with respect to the drive side clutch member 142. Each of the protrusions 152a of the torque ring 152 is engaged with an engagement recess 153a (see FIG. 8) of the housing space 153. Therefore, when the torque ring 152 is rotated together with the intermediate shaft 123, the protrusion 152a pushes a radial wall surface of the drive side clutch member 142 which faces the engagement recess 153a, or a torque transmission surface 153b, in the circumferential direction, so that the drive side clutch member 142 rotates together with the torque ring 152. Further, the driven side clutch member 143 is integrated with the second intermediate gear 133.

The drive side clutch member 142 is biased toward a power transmission position in which the cams 142a are engaged with the cams 143a of the driven side clutch member 143, by an elastic member in the form of a clutch spring 144 comprising a compression coil spring. The clutch spring 144 is elastically disposed between the drive side clutch member 142 and the first intermediate gear 132.

Figure 11:
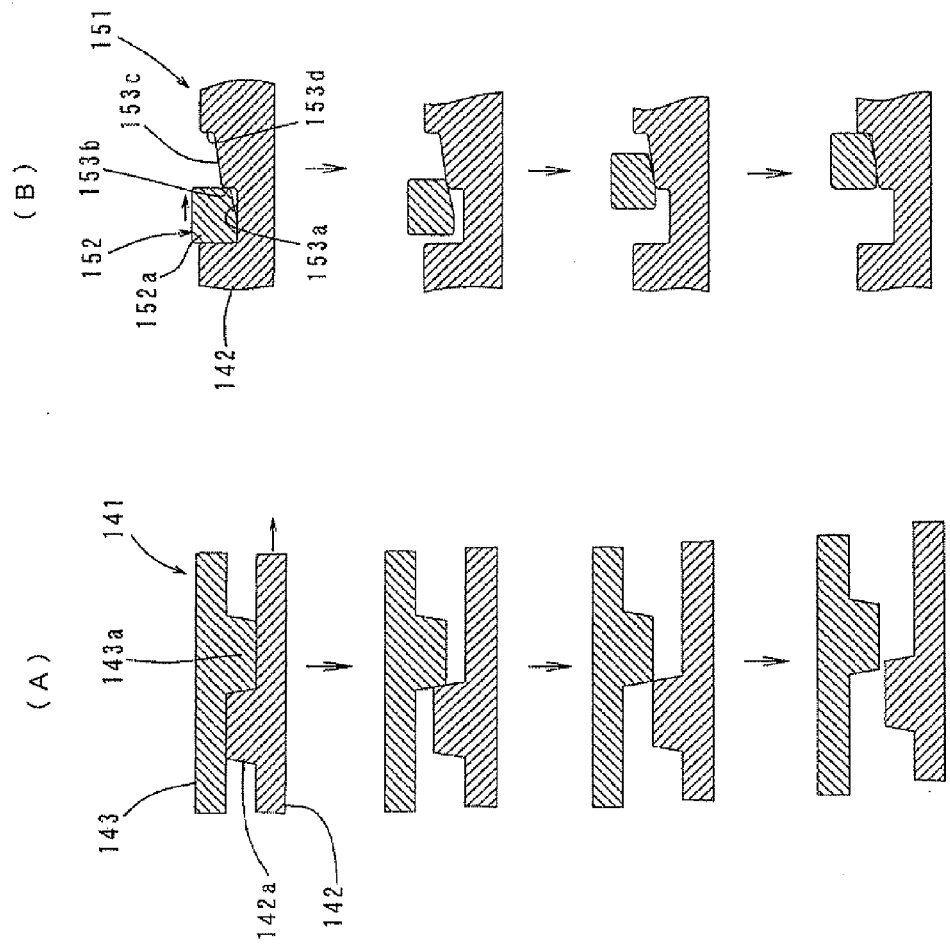

In the state in which the blade 113 is rotationally driven by using the first power transmission path P1, when the blade 113 is subjected to a load exceeding a predetermined value which overcomes the biasing force of the clutch spring 144, the drive side clutch member 142 is moved (retracted) away from the driven side clutch member 143 by components of a force acting upon inclined surfaces of the cams 142a, 143a in the longitudinal direction. Specifically, the drive side clutch member 142 is moved to a power release position and thus brought into a power transmission interrupted state by disengagement of the cams 142a, 143a. FIG. 11 (A) shows the sliding engagement clutch 141 shifting from the power transmission state to the power transmission interrupted state. When the sliding engagement clutch 141 is shifted to the power transmission interrupted state, the one-way clutch 145 is activated, so that the power transmission path is switched from the high-speed low-torque first power transmission path P1 to the low-speed high-torque second power transmission path P2.

Figure 15:
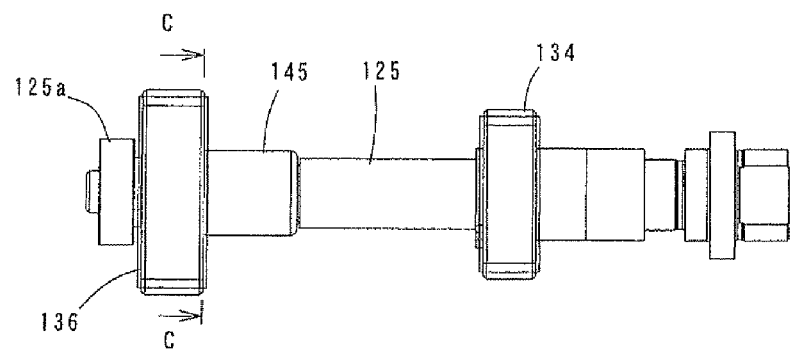
FIG. 15 is a side view showing parts provided on an output shaft.
Figure 16:
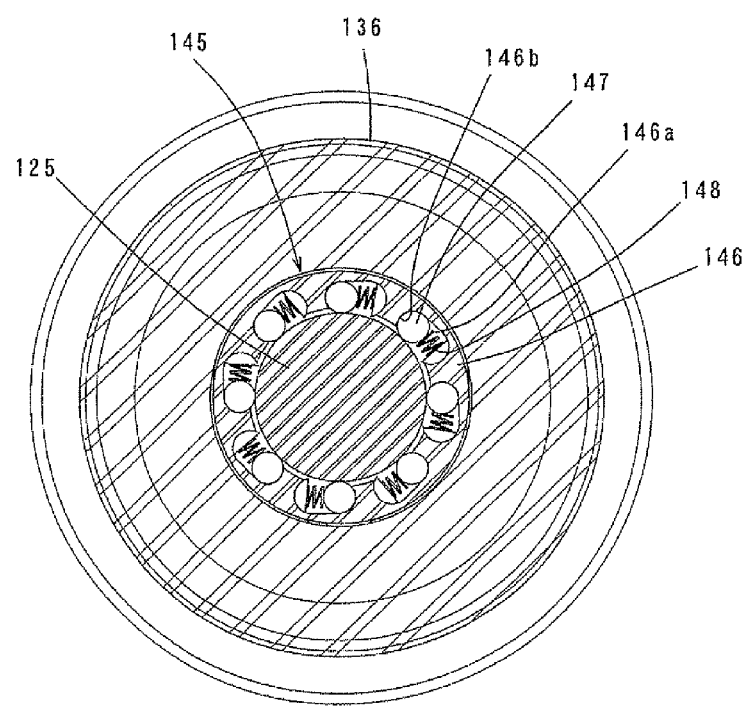
FIG. 16 is a sectional view taken along line C-C in FIG. 15.

The one-way clutch 145 is now explained. The construction of the one-way clutch 145 is shown in FIGS. 15 and 16. FIG. 15 is a side view showing parts provided on the output shaft 125, and FIG. 16 is a sectional view taken along line C-C in FIG. 15. The one-way clutch 145 mainly includes an outer ring 146 that rotates together with the second driven gear 136, a plurality of needle rollers 147 and springs 148 which are disposed between the outer ring 146 and the output shaft 125. The needle rollers 147 are rotatably disposed in cam grooves 146a which are formed in the outer ring 146 at predetermined intervals in the circumferential direction, and biased by the springs 148 toward the position of engagement with cam faces 146b.

Therefore, when the outer ring 146 is rotated clockwise as viewed in FIG. 16 together with the first driven gear 134 with respect to the output shaft 125, the needle rollers 147 are engaged between the associated cam faces 146b and the output shaft 125 by the biasing force of the associated springs 148, and drive the output shaft 125 by a wedging action. This state is shown in FIG. 16. When the output shaft 125 rotates at higher speed than the outer ring 146, the outer ring 146 rotates counterclockwise as viewed in the drawing with respect to the output shaft 125. Therefore, the needle rollers 147 are disengaged from the associated cam faces 146b, so that the outer ring 146 idles with respect to the output shaft 125. Specifically, when the sliding engagement clutch 141 is in the power transmission state, the outer ring 146 rotates counterclockwise as viewed in the drawing with respect to the output shaft 125, so that the one-way clutch 145 idles and does not transmit power.

With the speed change mechanism 117 constructed as described above, when the driving motor 115 is stopped, the sliding engagement clutch 141 is held such that the drive side clutch member 142 is biased toward the driven side clutch member 143 by the biasing force of the clutch spring 144. Specifically, it is held in the power transmission state in which the cams 142a, 143a of the clutch members 142, 143 are engaged with each other. In this state, when the driving motor 115 is driven to perform a cutting operation on a workpiece, the torque of the driving motor 115 is transmitted to the output shaft 125 via the first power transmission path P1. Specifically, the blade 113 is rotated at high speed and low torque via the pinion gear 131, the first intermediate gear 132, the intermediate shaft 123, the sliding engagement clutch 141, the second intermediate gear 133, the first driven gear 134 and the output shaft 125.

At this time, the outer ring 146 of the one-way clutch 145 is also rotated via the intermediate shaft 123, the third intermediate gear 135 and the second driven gear 136. As described above, however, the outer ring 146 idles because the output shaft 125 rotates at higher speed than the outer ring 146.

As described above, a cutting operation on a workpiece by the blade 113 starts at high speed and low torque via the first power transmission path P1. Thereafter, when the load applied to the blade 113 reaches a switching set value defined by the clutch spring 144 of the sliding engagement clutch 141, the sliding engagement clutch 141 is shifted to the power transmission interrupted state. Specifically, as shown in FIG. 11(A), the drive side clutch member 142 is moved away from the driven side clutch member 143 against the biasing force of the clutch spring 144 by components of the force acting upon the drive side clutch member 142 in the longitudinal direction via the cam faces (inclined surfaces) of the cams 142a, 143a, so that the cams 142a, 143a are disengaged from each other. Thus, the sliding engagement clutch 141 is shifted to the power transmission interrupted state, and when the speed of rotation of the output shaft 125 is reduced to below the speed of rotation of the outer ring 146 of the one-way clutch 145, the needle rollers 147 are engaged between the associated cam faces 146b and the output shaft 125 by the biasing force of the associated springs 148, and drive the output shaft 125 by a wedging action. As a result, the transmission path of the torque of the driving motor 115 is switched from the first power transmission path P1 to the second power transmission path P2, and the blade 113 is rotated at low speed and high torque which are determined by the gear ratio between the pinion gear 131 and the first intermediate gear 132 and the gear ratio between the third intermediate gear 135 and the second driven gear 136.

As described above, according to this embodiment, when the load applied to the blade 113 is low, the cutting operation can be performed on the workpiece at high speed and low torque by using the first power transmission path P1 having a low gear ratio. On the other hand, when the load applied to the blade 113 is high, the cutting operation can be performed on the workpiece at low speed and high torque by using the second power transmission path P2 having a high gear ratio.

With such a construction in which the torque transmission path is automatically switched from the high-speed low-torque first power transmission path P1 to the low-speed high-torque second power transmission path P2 according to the load applied to the blade 113, compared with a circular saw having no speed change mechanism, the driving motor 115 can be prevented from being burnt, and the work rate of cutting on a single charge of the battery 108 can be improved.

Particularly, in this embodiment, switching from the first power transmission path P1 to the second power transmission path P2 can be made in the state in which the gears in the gear trains forming the speed change mechanism 117 are held engaged with each other, or in which the positions of the gears are fixed. Therefore, speed changing operation can be performed with increased smoothness.

Further, according to this embodiment, with the construction in which the sliding engagement clutch 141 is provided on the intermediate shaft 123 and the one-way clutch 145 is provided on the output shaft 125, switching of the transmission path from the first power transmission path P1 to the second power transmission path P2 can be achieved simply by controlling the operation of the sliding engagement clutch 141. Thus, the rational speed change mechanism 117 can be obtained.

Further, in this embodiment, by the arrangement of the sliding engagement clutch 141 on the intermediate shaft 123 which rotates at higher speed and lower torque than the output shaft 125, the load on the sliding engagement clutch 141 can be reduced. Therefore, such a construction is effective in protecting the clutch or improving the durability of the clutch. Further, in terms of the arrangement of the shafts with respect to the gear housing 107, the intermediate shaft 123 is disposed toward the center of the gear housing 107. Therefore, by disposing the sliding engagement clutch 141 which is larger in the radial direction than the one-way clutch 145, on the intermediate shaft 123, the gear housing 107 can be prevented from increasing in size.

The maximum cutting depth of the circular saw 101 (the amount of protrusion of the lower edge portion of the blade 113 from the underside of the base 111) is defined by contact of a maximum cutting depth control part formed on the gear housing 107 with a stopper on the base 111, which is not shown, when the user depresses the handgrip 109 downward from the state shown in FIG. 2 so that the circular saw body 103 is rotated on a pivot (not shown) provided on the front end portion of the base 111. Therefore, for example, if the sliding engagement clutch 141 having a large outside diameter is provided on the output shaft 125, the distance from the center of the output shaft 125 to a lower end surface 107L of the gear housing 107 is increased, which affects the maximum cutting ability. Thus, the maximum cutting ability is degraded. According to this embodiment, however, by providing the sliding engagement clutch 141 on the intermediate shaft 123, the distance from the output shaft 125 to the lower end surface 107L of the gear housing 107 can be decreased, which does not affect the maximum cutting ability.

The one-way clutch 145 is provided on the output shaft 125. The second driven gear 136 on the output shaft 125 on the speed reduced side has a larger diameter than the third intermediate gear 135 on the intermediate shaft 123. Therefore, by disposing the one-way clutch 145 between the output shaft 125 and the second driven gear 136, a mounting space for the one-way clutch 145 can be easily secured, so that the one-way clutch 145 can be easily mounted.

In a construction in which the sliding engagement clutch 141 is automatically shifted according to the load applied to the blade 113, if the load applied to the blade 113 fluctuates around the switching set value defined by the clutch spring 144, the sliding engagement clutch 141 is frequently shifted. Therefore, in order to solve such a problem, the speed change mechanism 117 according to this embodiment is provided with a latching mechanism 151 and a reset mechanism. Once the sliding engagement clutch 141 is shifted to a power transmission interrupted state, the shifted state is retained by the latching mechanism 151. The reset mechanism serves to return it to the initial state or power transmission state after stop of the cutting operation (when the driving motor 115 is stopped). The latching mechanism 151 is a feature that corresponds to the "switching retaining mechanism" according to this invention.

The latching mechanism 151 is now explained mainly with reference to FIGS. 7, 8, 10 and 11. When the drive side clutch member 142 of the sliding engagement clutch 141 is moved to the power transmission interrupted position, the latching mechanism 151 serves to retain the drive side clutch member 142 in the power transmission interrupted position, or particularly in the position in which the cams 142a of the drive side clutch member 142 are separated (opposed with a clearance) from the cams 143a of the driven side clutch member 143. The latching mechanism 151 mainly includes the above-described torque ring 152. The torque ring 152 is a feature that corresponds to the "latching member" according to this invention.

In the housing space 153 which is formed in the drive side clutch member 142 in order to house the torque ring 152, an inclined surface 153c inclined upward and forward is formed on the drive side clutch member 142 in a forward region (in the direction of rotation) of each of the engagement recesses 153a with which the protrusions 152a of the torque ring 152 are engaged. When the drive side clutch member 142 is moved from the power transmission position to the power transmission interrupted position and thus brought into the power transmission interrupted state, the torque ring 152 is moved out of the housing space 153 and each of the protrusions 152a is moved onto the associated inclined surface 153c. Thus, the cams 142a of the drive side clutch member 142 are separated from the cams 143a of the driven side clutch member 143. This process is shown in FIG. 11. FIG. 11(A) shows the clutch movement, and FIG. 11(B) shows the movement of the torque ring 152 provided as the latching member. For smooth movement of the protrusion 152a of the torque ring 152 onto the inclined surface 153c, the surface of the protrusion 152a which faces the associated inclined surface 153c is configured as an inclined surface or arcuate curved surface. The housing space 153 is a feature that corresponds to the "recess" according to this invention.

As shown in FIG. 11 on the top, in the engaged state of the cams 142a, 143a in which the drive side clutch member 142 is placed in the power transmission position, as described above, the protrusion 152a of the torque ring 152 is engaged with the associated torque transmission surface 153b in the engagement recess 153a and held in the torque transmission state. In such a state, when the load applied to the blade 113 exceeds a predetermined value defined by the clutch spring 144 and the drive side clutch member 142 retracts toward the power transmission interrupted position, the torque ring 152 fixed on the intermediate shaft 123 moves in the longitudinal direction, or in a direction of movement out of the housing space 153, with respect to the drive side clutch member 142. Thus, the protrusion 152a of the torque ring 152 is slipped out of the associated engagement recess 153a and disengaged from the associated torque transmission surface 153b. As a result, a difference is caused in the rotation speed between the torque ring 152 and the drive side clutch member 142 to which torque is no longer transmitted. Therefore, the torque ring 152 moves in the circumferential direction with respect to the drive side clutch member 142, and the protrusion 152a of the torque ring 152 climbs on the edge end of the inclined surface 153c (see the second from the top in FIG. 11). By this climbing movement of the protrusion 152a, the drive side clutch member 142 is pushed in the longitudinal direction. Specifically, the drive side clutch member 142 is acted upon by a force in a direction (longitudinal direction) in which the cams 142a are separated from the cams 143a of the driven side clutch member 143. Separation of the cams 142a, 143a is assisted by this force. As a result, the load applied to the cam faces of the cams 142a, 143a is lessened, so that wear of the cams 142a, 143a can be reduced, and thus fluctuations of the switching set value defined by the clutch spring 144 can be minimized.

When the drive side clutch member 142 is further retracted and the cams 142a, 143a are disengaged from each other, the torque ring 152 further moves in the circumferential direction with respect to the drive side clutch member 142. Therefore, the protrusion 152a further climbs onto the inclined surface 153c. Specifically, assistance in separation of the cams 142a, 143a by this climbing movement is continued even after disengagement of the cams 142a, 143a. Therefore, the drive side clutch member 142 is further moved away from the driven side clutch member 143 so that a clearance is created in the longitudinal direction between the cams 142a, 143a. The protrusion 152a climbs on the inclined surface 153c and is engaged with a stopper surface 153d extending upright from the front end of the inclined surface 153c. Thereafter, the torque ring 152 and the drive side clutch member 142 rotate together. This state is shown in FIG. 11(B) on the bottom.

Specifically, when the drive side clutch member 142 is shifted from the power transmission state to the power transmission interrupted state, the torque ring 152 further retracts the drive side clutch member 142 past the power transmission interrupted position in which the cam 142a of the drive side clutch member 142 is disengaged from the cam 143a of the driven side clutch member 143, or to an isolated position in which a predetermined clearance is secured in the longitudinal direction between the cams 142a, 143a, and retains it in this isolated position. Thus, once the sliding engagement clutch 141 is shifted to the power transmission interrupted state, it retains the shifted state regardless of the load applied to the blade 113. Therefore, even if the load applied to the blade 113 fluctuates around the switching set value defined by the clutch spring 144, stable cutting operation can be realized at low speed and high torque via the second power transmission path P2. Further, with the construction in which the drive side clutch member 142 is moved to the isolated position and held in the isolated position so that a certain clearance is secured in the longitudinal direction between the cams 142a, 143a, a reliable power transmission interrupted state can be obtained, and noise and vibration can be prevented from being caused by contact between the cams 142a, 143a.

When the driving motor 115 is stopped after completion of the cutting operation, a brake of the driving motor 115 is activated. Then, the rotation speed of the intermediate shaft 123 is reduced, so that a difference is caused in the rotation speed between the torque ring 152 which rotates together with the intermediate shaft 123 and the drive side clutch member 142 which tends to maintain its rotation speed by inertial torque. Thus, the two members 152, 142 rotate with respect to each other in the circumferential direction, or particularly in the direction in which the protrusion 152a of the torque ring 152 climbs down the inclined surface 153c of the drive side clutch member 142. Therefore, the protrusion 152a is engaged in the engagement recess 153a of the housing space 153. Specifically, the torque ring 152 is returned (reset) to its initial position, so that the power transmission interrupted state held by the sliding engagement clutch 141 is automatically released. Thus, the reset mechanism is formed by utilizing the brake of the driving motor 115 and the inertia of the drive side clutch member 142. When the power transmission interrupted state held by the torque ring 152 is released by the function of the reset mechanism, the drive side clutch member 142 is moved to the power transmission position by the biasing force of the clutch spring 144, so that it can be properly made ready for the next cutting operation.

Further, in the case of the speed change mechanism 117 according to this embodiment, when the blade 113 has a large mass and great inertia, at the time of startup of the driving motor 115, the sliding engagement clutch 141 may malfunction, or particularly shift from the power transmission state to the power transmission interrupted state and cause speed change. In order to solve such a problem, the speed change mechanism 117 according to this embodiment is provided with a speed change preventing mechanism 161 for preventing speed change at the time of startup of the motor.

Figure 12:
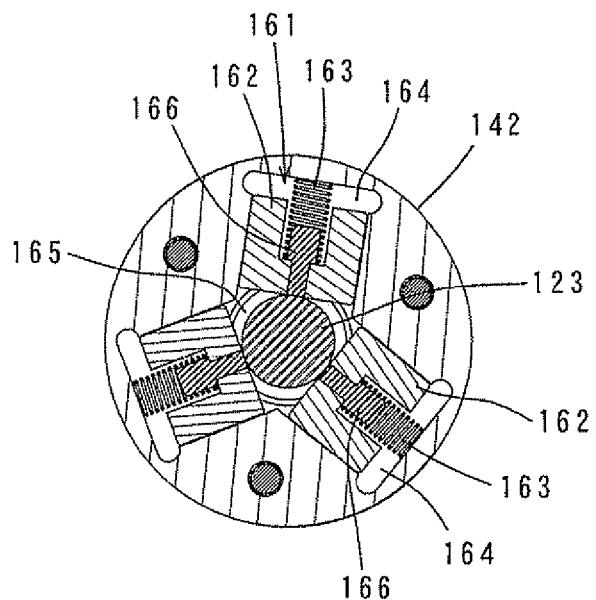
FIG. 12 is a sectional view taken along line B-B in FIG. 6.
Figure 13:
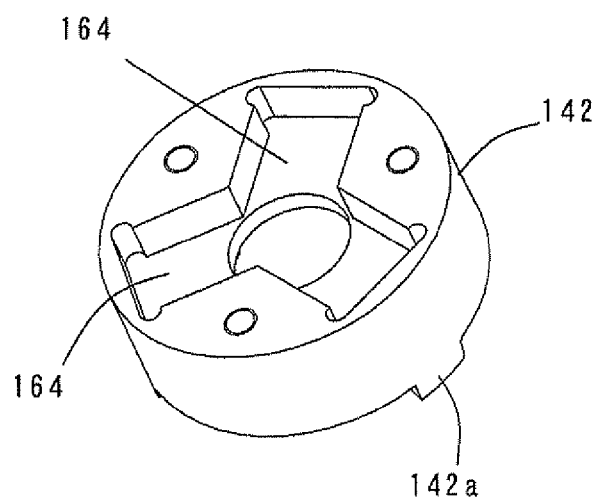
FIG. 13 is a perspective view of the drive side clutch member as viewed from a clutch spring mounting side.
Figure 14:
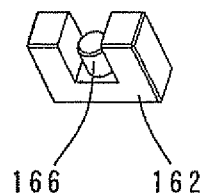
FIG. 14 is a perspective view of a stopper.

The speed change preventing mechanism 161 is now explained mainly with reference to FIGS. 12 to 14. FIG. 12 is a sectional view taken along line B-B in FIG. 6. FIG. 13 is a perspective view of the drive side clutch member 142 as viewed from the clutch spring mounting side. FIG. 14 is a perspective view of a stopper 162. The speed change preventing mechanism 161 according to this embodiment mainly includes a plurality of (for example, three) stoppers 162 and elastic members in the form of compression coil springs 163 which are radially arranged in the drive side clutch member 142.

Stopper housing recesses 164 are formed on the clutch spring mounting side (the side opposite from the cam 142a side) of the drive side clutch member 142 and arranged equiangularly in the circumferential direction. The stoppers 162 and the compression coil springs 163 are disposed within the stopper housing recesses 164 and can move in the radial direction. A radially inner end of each of the stoppers 162 faces the outer circumferential surface of the intermediate shaft 123, and the stopper 162 is pressed and biased toward the intermediate shaft 123 by the associated compression coil spring 163. An annular groove 165 is formed in the circumferential direction in a region of the outer circumferential surface of the intermediate shaft 123 which faces the stoppers 162. When the drive side clutch member 142 is placed in the power transmission position, the radially inner end of each of the stoppers 162 enters the annular groove 165 in the outer circumferential surface of the intermediate shaft 123 from the radial direction and is elastically engaged therewith, so that the drive side clutch member 142 is held in the power transmission position. This state is shown in FIGS. 12 and 4.

Movement of each of the compression coil springs 163 is stabilized by a guide pin 166 provided in each of the stoppers 162. Further, as shown in FIGS. 4 and 5, a cover 167 is mounted on the side of the drive side clutch member 142 in order to cover the stoppers 162 and the compression coil springs 163 disposed within the stopper housing recesses 164. The cover 167 also serves as a spring receiving member for supporting one end of the clutch spring 144.

The speed change preventing mechanism 161 according to this embodiment is constructed as described above. When the driving motor 115 is in the stopped state, the sliding engagement clutch 141 is in the power transmission state. Thus, the stoppers 162 are held in engagement with the annular groove 165 of the intermediate shaft 123. Therefore, at the time of startup of the driving motor 115, the stoppers 162 held in engagement with the annular groove 165 of the intermediate shaft 123 prevent the drive side clutch member 142 from moving in the longitudinal direction, so that the drive side clutch member 142 is held in the power transmission position in which the cams 142a are engaged with the cams 143a of the driven side clutch member 143. In this manner, the sliding engagement clutch 141 can be prevented from malfunctioning at the time of startup of the motor.

When the driving motor 115 is started and the motor speed is increased, however, the stoppers 162 are moved outward against the biasing force of the compression coil spring 163 by centrifugal force acting upon the stoppers 162 which rotate together with the drive side clutch member 142, so that the stoppers 162 are disengaged from the annular groove 165 (see FIG. 5). Thus, the stoppers 162 can no longer prevent the drive side clutch member 142 from moving, so that the drive side clutch member 142 is allowed to shift from the power transmission state to the power transmission interrupted state according to the load applied to the blade 113.

Thus, by provision of the speed change preventing mechanism 161 according to this embodiment, in the circular saw 101 having the blade 113 with great inertia, the speed change mechanism 117 does not cause such a malfunction that it causes speed change by inertia of the blade 113 at the time of startup of the driving motor 115. Therefore, the advantage of the speed change mechanism 117 can be fully utilized. Further, the speed change preventing mechanism 161 is particularly effective not only in the circular saw 101 but in a power tool having a tool bit of a great mass, such as a grinder for grinding and polishing and a diamond core drill for drilling a relatively large-diameter hole.

Second Embodiment of the Invention

Figure 17:
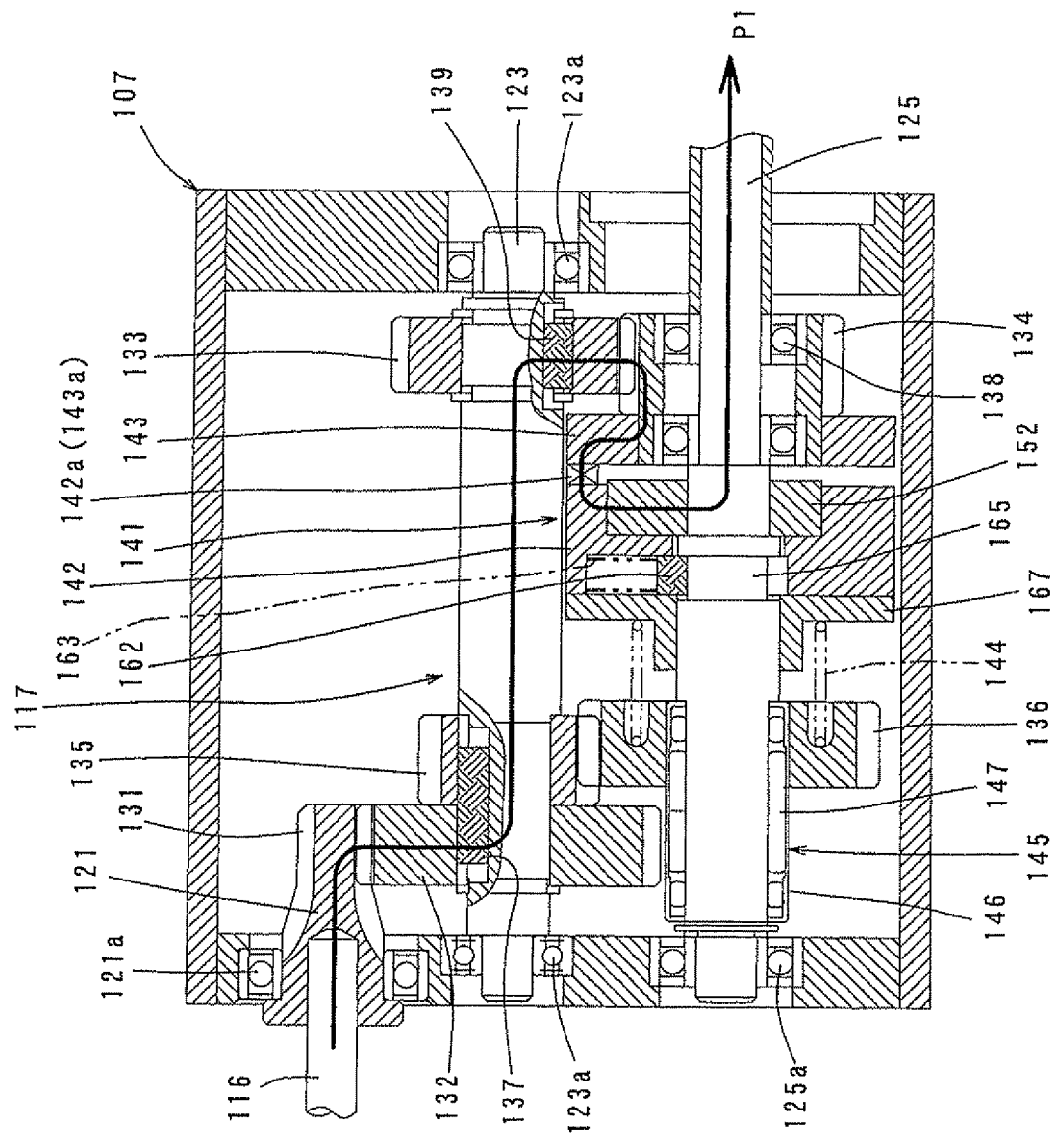
FIG. 17 is a developed sectional view of a parallel three-shaft type speed change mechanism according to a second embodiment of the invention, in the state in which a power transmission path is switched to a high-speed low-torque path.
Figure 18:
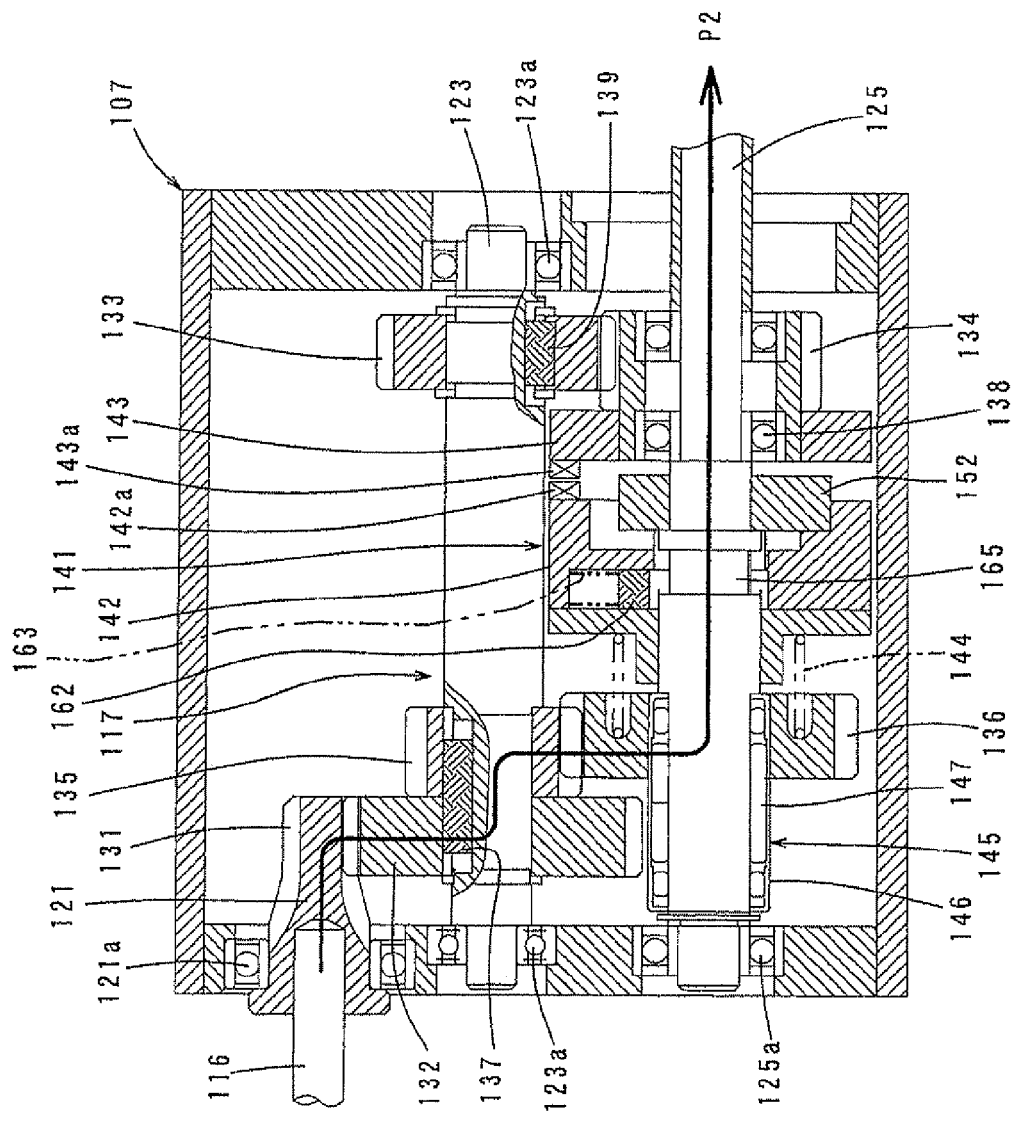
FIG. 18 is also a developed sectional view of the parallel three-shaft type speed change mechanism in the state in which the power transmission path is switched to a low-speed high-torque path.

A second embodiment of the invention is now explained with reference to FIGS. 17 and 18. In this embodiment, the sliding engagement clutch 141 is disposed on the output shaft 125 and effects speed change on the output shaft 125. In the other points, this embodiment has the same construction as the above-described first embodiment. Therefore, components shown in FIGS. 17 and 18 are given like numerals as in the first embodiment and will not be described or briefly described. FIGS. 17 and 18 are developed sectional views showing the construction of the speed change mechanism 117.

The sliding engagement clutch 141 is mounted on the output shaft 125. By this arrangement, the second intermediate gear 133 is fixedly mounted on the intermediate shaft 123 by the key 139, and the first driven gear 134 normally engaged with the second intermediate gear 133 is rotatably supported on the output shaft 125 via the bearing 138.

Further, the sliding engagement clutch 141 mainly includes the drive side clutch member 142, the driven side clutch member 143 and the clutch spring 144. In this point, this embodiment is the same as the above-described first embodiment. In this embodiment, however, the direction of transmission of power is opposite to that in the first embodiment in which the sliding engagement clutch 141 is mounted on the intermediate shaft 123. Specifically, the clutch member 143 which rotates together with the first driven gear 134 is on the drive side, and the clutch member 142 which rotates together with the output shaft 125 via the torque ring 152 is on the driven side. The clutch spring 144 is disposed between the driven side clutch member 142 and the second driven gear 136 to which the one-way clutch 145 is mounted and biases the driven side clutch member 142 toward the drive side clutch member 143.

Therefore, when the load applied to the blade 113 is low, the torque of the driving motor 115 is transmitted to the blade 113 via the first power transmission path P1 which is formed by the pinion gear 131 of the input shaft 121, the first intermediate gear 132, the intermediate shaft 123, the second intermediate gear 133, the first driven gear 134, the sliding engagement clutch 141 and the output shaft 125. Then the blade 113 is rotationally driven at high speed and low torque. This state is shown in FIG. 17.

When a load exceeding a switching set value defined by the clutch spring 144 is applied to the blade 113, the driven side clutch member 142 is moved from the power transmission position to the power transmission interrupted position against the biasing force of the clutch spring 144. Thus, the cams 142a of the driven side clutch member 142 are disengaged from the cams 143a of the drive side clutch member 143. As a result, the torque of the driving motor 115 is transmitted to the blade 113 via the second power transmission path P2 which is formed by the pinion gear 131 of the input shaft 121, the first intermediate gear 132, the intermediate shaft 123, the third intermediate gear 135, the second driven gear 136, the one-way clutch 145 and the output shaft 125. Then the blade 113 is rotated at low speed and high torque. This state is shown in FIG. 18.

As described above, in this embodiment, like in the above-described first embodiment, the power transmission path can be switched from the first power transmission path P1 to the second power transmission path P2 in the state in which the gears in the gear trains forming the speed change mechanism 117 are held engaged with each other, or in which the positions of the gears are fixed. Therefore, speed changing operation can be performed with increased smoothness.

Third Embodiment of the Invention

Figure 19:
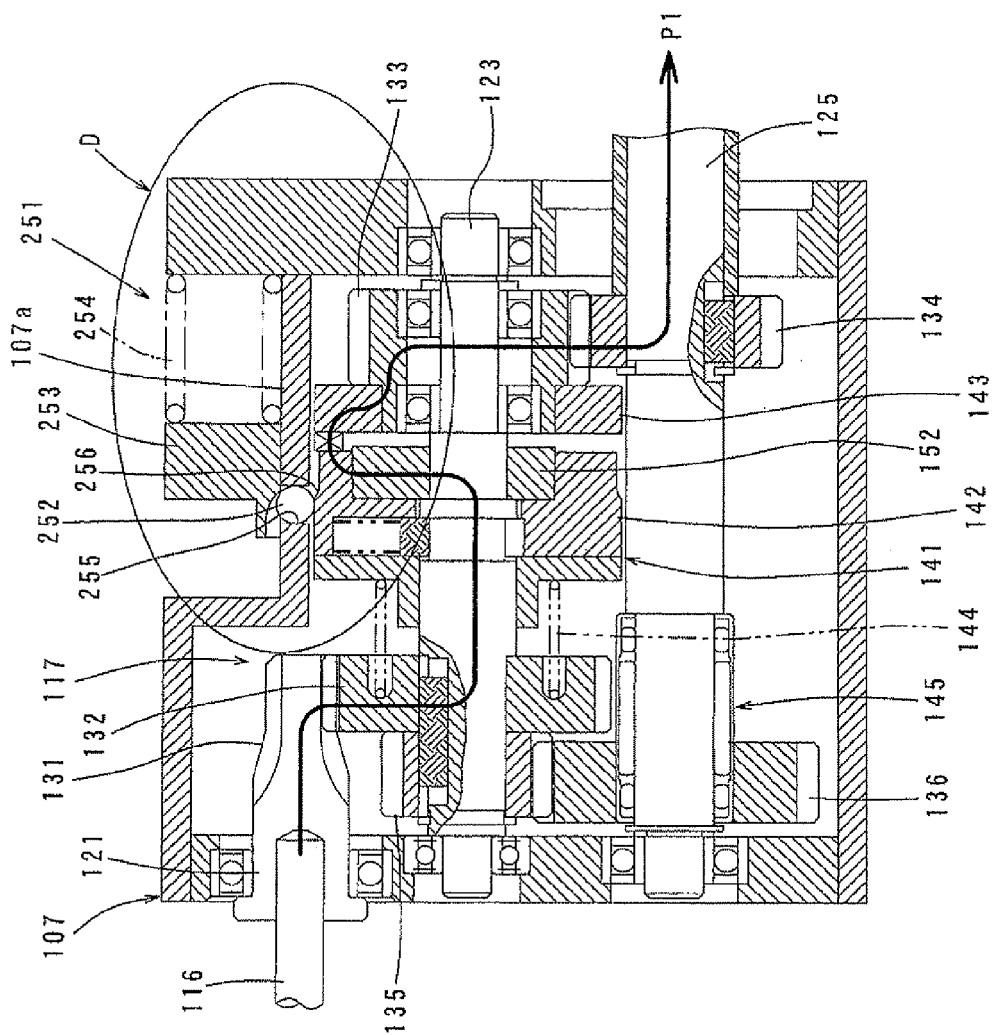
FIG. 19 is a developed sectional view of a latching mechanism according to a third embodiment of the invention, in the state in which a power transmission path of a speed change mechanism is switched to a high-speed low-torque path.
Figure 20:
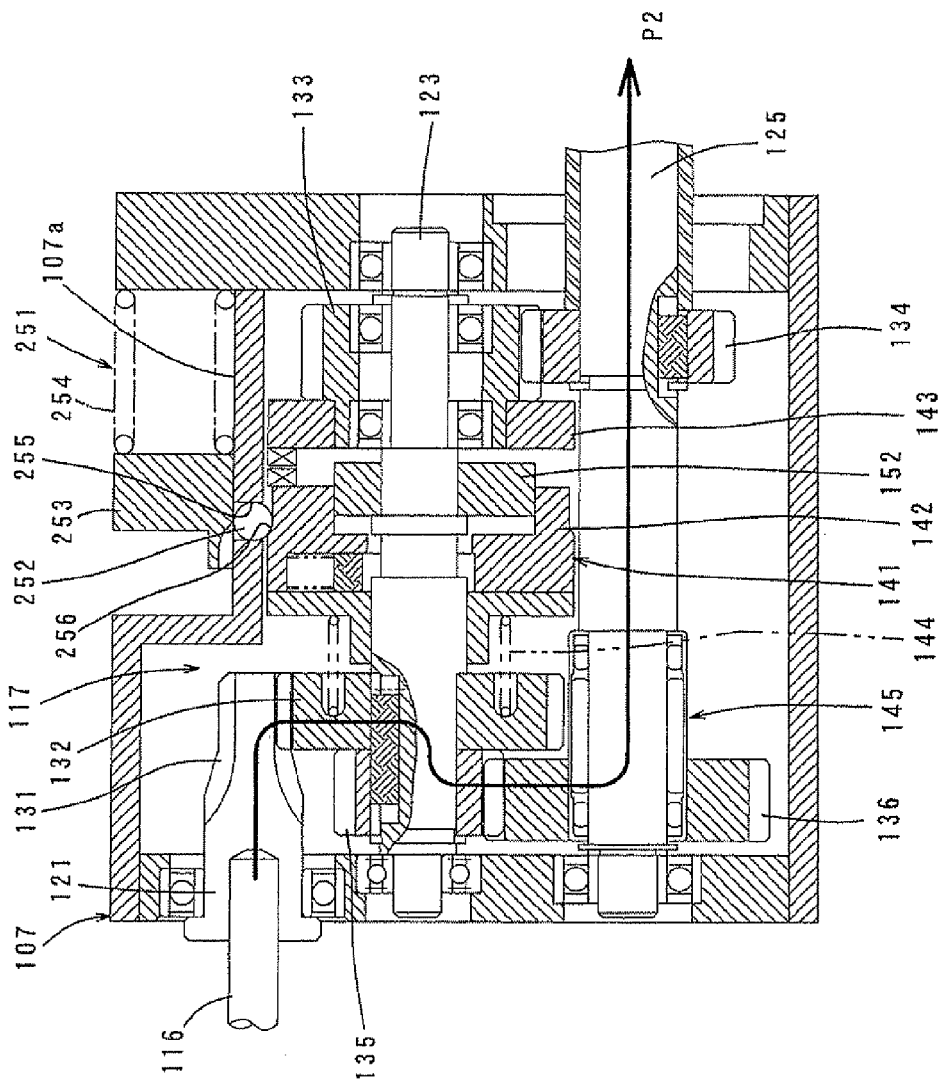
FIG. 20 is also a developed sectional view of the latching mechanism, in the state in which the power transmission path of the speed change mechanism is switched to a low-speed high-torque path.
Figure 21:
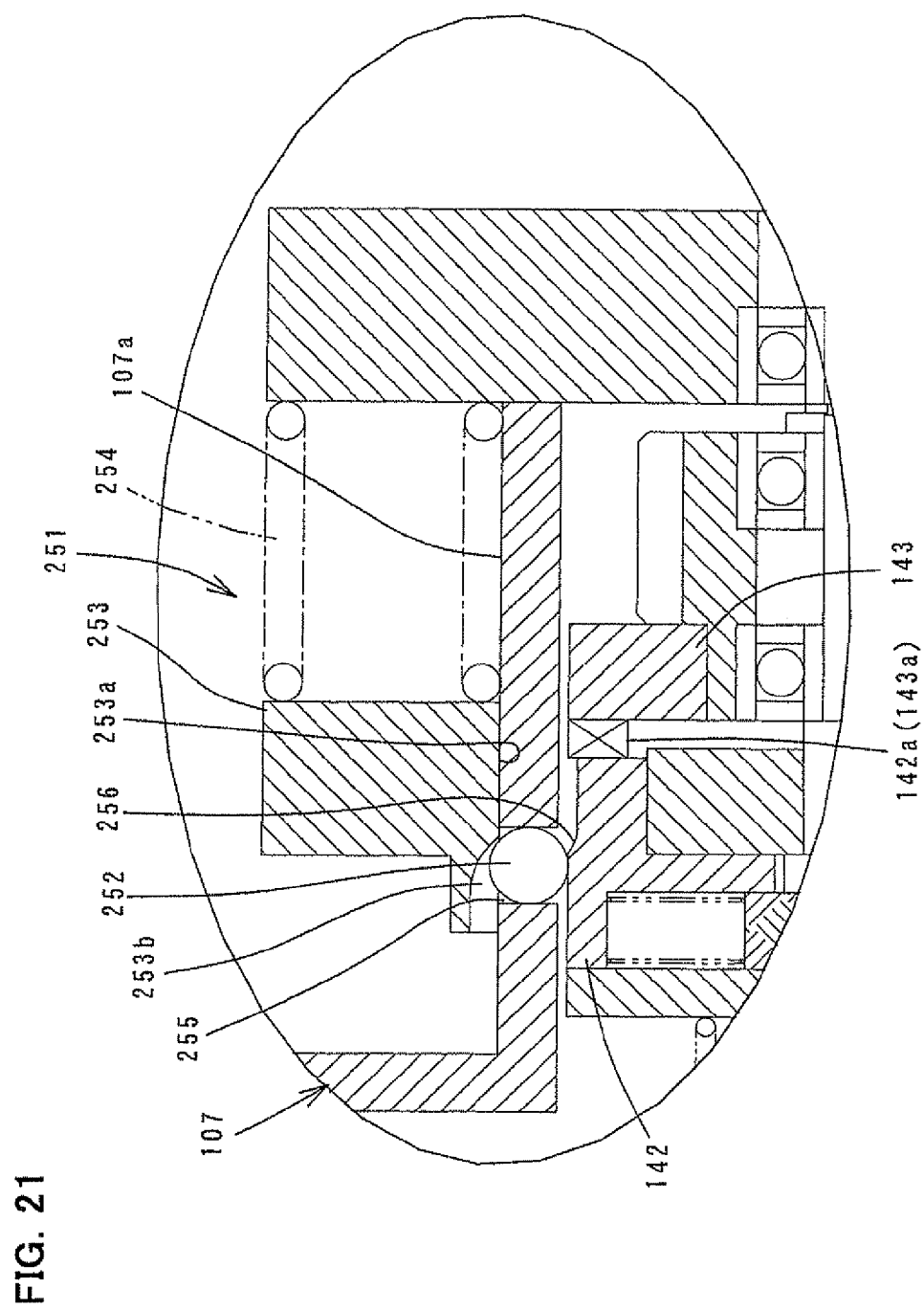
FIG. 21 is an enlarged view of part D of FIG. 19.

A third embodiment of the invention is now explained with reference to FIGS. 19 to 21. This embodiment is a modification relating to a latching mechanism 251 by which, once the sliding engagement clutch 141 is shifted to a power transmission interrupted state, the shifted state is retained. The second embodiment has the same construction as the above-described first embodiment except for the latching mechanism 251. Therefore, components of the speed change mechanism 117 which are not related to the latching mechanism shown in FIGS. 19 and 20 are given like numerals as in the first embodiment and will not be described or briefly described. FIGS. 19 and 20 are developed sectional views, and FIG. 21 is an enlarged view of part D of FIG. 19.

The latching mechanism 251 according to this embodiment is arranged on the gear housing 107 and mainly includes a ball 252, a slide block 253 and a compression coil spring 254. The ball 252 and the compression coil spring 254 are features that correspond to the "latching member" and the "biasing member", respectively, according to this invention. A latch mounting region 107a is provided on the gear housing 107 in order to mount the latching mechanism 251 such that the latching mechanism 251 can be moved closer to the sliding engagement clutch 141. The ball 252 is inserted in a ball holding hole 225 which is formed radially through the latch mounting region 107a of the gear housing 107 in an area of the latch mounting region 107a which faces the outer circumferential surface of the drive side clutch member 142 of the sliding engagement clutch 141. The ball 252 is allowed to move in a direction transverse to the longitudinal direction of the drive side clutch member 142 (the axial direction of the intermediate shaft 123). Further, the compression coil spring 254 has a larger spring constant than the clutch spring 144.

The ball 252 is biased from the outside to the inside of the latch mounting region 107a via a slide block 253 by the compression coil spring 254 and elastically pressed in the radial direction against the outer surface of the drive side clutch member 142. The drive side clutch member 142 has a stepped cylindrical shape having a smaller-diameter portion facing the driven side clutch member 143 and a larger-diameter portion facing away from the driven side clutch member 143. A connecting region between the smaller-diameter portion and the larger-diameter portion is formed by a concave curved surface 256. The curved surface 256 may be changed to an inclined surface. The curved surface 256 is a feature that corresponds to the "engagement part" according to this invention. The ball 252 is pressed radially inward by the compression coil spring 254 and thus applies a force to the drive side clutch member 142 via the curved surface 256 in a direction (longitudinal direction) in which the earns 142*a* are separated from the cams 143*a* of the driven side clutch member 143, thereby assisting in separation of the cams 142*a*, 143*a*. The width (length in the longitudinal direction) of the curved surface 256 is set such that this assistance is started midway through the retracting movement of the drive side clutch member 142 and continued until the cams 142*a*, 143*a* are disengaged from each other and a predetermined clearance is created between the cams 142*a*, 143*a*.

The slide block 253 is mounted on the outer surface of the latch mounting region 107*a* such that it can slide in a direction parallel to the longitudinal direction of the drive side clutch member 142, and the slide block 253 is biased by the compression coil spring 254. The slide block 253 can press the ball 252 toward the drive side clutch member 142 via a contact surface of the slide block 253 in contact with the outer wall surface of the latch mounting region 107*a*, or a slide surface 253*a*. A notch 253*b* is further formed in a front end portion of the slide surface 253*a* of the slide block 253 (on the side facing away from the compression coil spring 254) and serves to release the ball 252 pressed by the slide block 253.

When the sliding engagement clutch 141 is in the power transmission state, or the drive side clutch member 142 is moved toward the driven side clutch member 143 into the power transmission position, the ball 252 is pressed by the outer surface of the larger-diameter portion of the drive side clutch member 142 and protrudes out of the gear housing 107. At this time, the protruding surface of the ball 252 is held in contact with the edge of the notch 253*b* of the slide block 253. This state is defined as an initial position of the latching mechanism 251. This state is shown in FIG. 19.

The latching mechanism 251 according to this embodiment is constructed as described above. Therefore, under high-speed and low-torque driving conditions in which the torque of the driving motor 115 is transmitted to the blade 113 via the first power transmission path P1 of the speed change mechanism 117, the latching mechanism 251 is held in the initial position. When a load exceeding a certain value defined by the clutch spring 144 is applied to the blade 113 as the cutting operation by the blade 113 proceeds, the drive side clutch member 142 is retracted (by engagement of the inclined surfaces of the cams 142*a*, 143*a* in the same manner as in the first embodiment) to the power transmission interrupted position in which it is separated from the driven side clutch member 143. As a result, the sliding engagement clutch 141 is shifted to the power transmission interrupted state, so that the torque transmission path to the blade 113 is switched from the first power transmission path P1 to the second power transmission path P2.

When the drive side clutch member 142 is moved to the power transmission interrupted position, or the cams 142*a* of the drive side clutch member 142 are disengaged from the cams 143*a* of the driven side clutch member 143, the ball 252 is engaged with the curved surface 256 or the connecting region between the larger-diameter portion and the smaller-diameter portion of the drive side clutch member 142, so that the drive side clutch member 142 is held in the power transmission interrupted position. This state in shown in FIG. 20.

In this embodiment, it is designed such that the ball 252 approaches the front end of the curved surface 256 in the retracting direction when the cams 142*a* of the drive side clutch member 142 reach the verge of separation from the cams 143*a* of the driven side clutch member 143 (for example, the position shown in the second or the third from the top in FIG. 11(A)). Then the ball 252 acted upon by the biasing force of the compression coil spring 254 via the slide block 253 presses the curved surface 256 from the radial direction, and by components of this pressing force acting upon the curved surface 256 in the longitudinal direction, the ball 252 further retracts the drive side clutch member 142 against the biasing force of the clutch spring 144. Thus, the drive side clutch member 142 is further retracted to an isolated position in which the drive side clutch member 142 is further separated from the driven side clutch member 143 past the power transmission interrupted position in which the cams 142*a*, 143*a* are disengaged from each other. As a result, like in the above-described first embodiment, a certain clearance can be created in the longitudinal direction between the cams 142*a* of the drive side clutch member 142 and the cams 143*a* of the driven side clutch member 143 (see the bottom in FIG. 11(A)).

Further, the ball 252 held in engagement with the curved surface 256 is held in contact with the slide surface 253*a* of the slide block 253 and thus prevented from moving radially outward, so that the sliding engagement clutch 141 is reliably held in the power transmission interrupted state. Further, in order to return the drive side clutch member 142 held in the power transmission interrupted state by the ball 252 to the power transmission state (initial state), the slide block 253 is slid against the biasing force of the compression coil spring 254 with user's finger so that the ball 252 locked by the slide surface 253*a* is released. Further, in this embodiment, the torque ring 152 disposed between the drive side clutch member 142 and the intermediate shaft 123 is designed to serve only as a torque transmitting member.

As described above, by provision of the latching mechanism 251 according to this embodiment, once the sliding engagement clutch 141 is shifted to the power transmission interrupted state, it can retain the power transmission interrupted state regardless of the load applied to the blade 113. Therefore, even if the load applied to the blade 113 fluctuates around the switching set value defined by the clutch spring 144, stable cutting operation can be realized at low speed and high torque by using the second power transmission path P2. Further, a certain clearance can be secured in the longitudinal direction between the cams 142*a*, 143*a*, so that a reliable power transmission interrupted state can be obtained. Thus, noise and vibration can be prevented from being caused by interference between the cams 142*a*, 143*a*.

The speed change mechanism 117 according to this embodiment is described as being of a parallel three-shaft type, but it may be of a two-shaft type having two parallel shafts, or an input shaft and an output shaft. Further, it may be of a type in which the one-way clutch 145 is disposed on the intermediate shaft 123 side. Further, in this embodiment, the battery-powered circular saw 101 is described as a representative example of a power tool according to the invention, but it is not limited to this. This invention can be applied to an AC-powered circular saw as well as the battery-powered circular saw, and to a tabletop circular saw and a tabletop slide circular saw which perform a cutting operation on a workpiece placed on a table of a base, as well as the hand-held circular saw as shown in the drawings, and also to a circular saw for woodworking or metalworking. It can also be applied to a cutting tool other than a circular saw, such as an electric cutter, and a cutting tool having a reciprocating tool bit, such as a reciprocating saw and a jigsaw. Moreover, it can be widely applied to various kinds of power tools other than a cutting tool, such as a sander and a grinder which perform grinding or polishing operation on a workpiece by a rotating sanding disc or grinding wheel, a driver and a wrench for tightening operation, various kinds of drills for drilling operation, and a hedge trimmer for trimming a hedge by reciprocating upper and lower blades in opposite directions.

Further, it is effectively applied to a power tool, such as a sander and a diamond core drill, in which a load applied to the tool bit varies in one power tool with variations in the size of the tool bit used or with variations in workpieces.

In view of the scope and spirit of the invention, the following construction can be provided.

"The power tool, wherein an inclined surface is further formed on the side of the sliding side clutch member and faces a front region of the recess in the rotating direction, and when the sliding side clutch member is moved to the power transmission interrupted position, the latching member is moved out of the recess by the movement of the sliding side clutch member and climbs on the inclined surface due to a difference in the rotation speed between the sliding side clutch member and the latching member which is caused by the movement of the latching member out of the recess, thereby further moving the sliding side clutch member from the power transmission interrupted position to an isolated position in which the sliding side clutch member is further separated from an opposed clutch member and retaining the sliding side clutch member in the isolated position."

With this construction in which the sliding side clutch member is moved past the power transmission interrupted position in which the clutch members are disengaged from each other and to the isolated position in which they are further separated from each other, and retained in the isolated position. Therefore, a reliable power transmission interrupted state can be obtained, so that noise and vibration can be prevented from being caused by interference between the drive side and driven side clutch members.

Fourth Embodiment of the Invention

Figure 22:
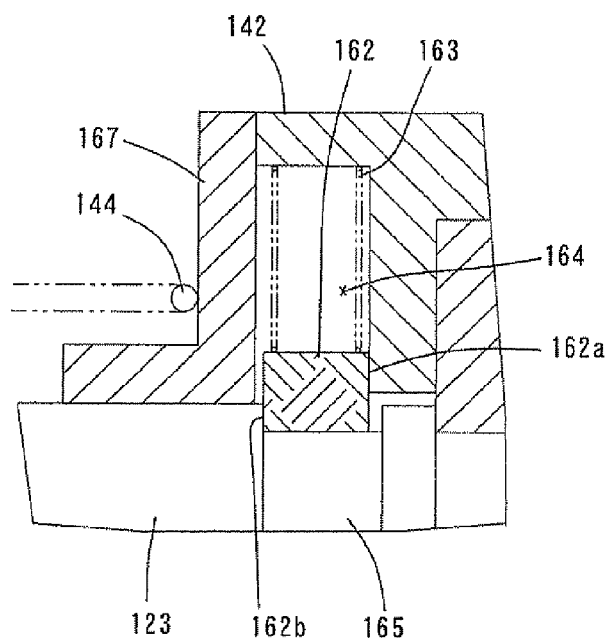
FIG. 22 is a view for illustrating speed change prevention by a stopper in further detail
Figure 22:
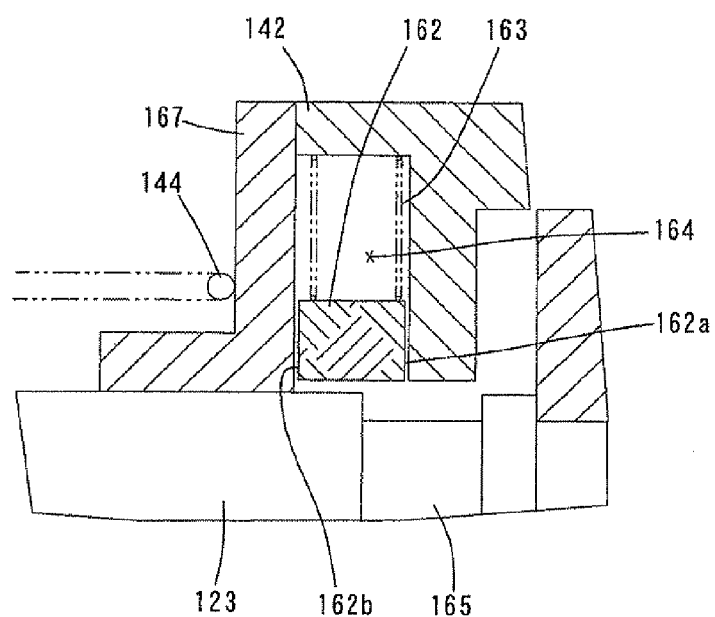

Speed change prevention by the stopper 162 at the time of startup of the motor is described in further detail with reference to FIG. 22. At the time of startup of the driving motor 115, when the drive side clutch member 142 tends to move away from the driven side clutch member 143 against the biasing force of the clutch spring 144 by the load on the driven side, the stopper 162 held in engagement with the annular groove 165 of the intermediate shaft 123 is pressed against the side wall of the annular groove 165. Thus, the drive side clutch member 142 is prevented from moving away from the driven side clutch member 143 and held in engagement with the driven side clutch member 143. As shown in FIG. 22(A), the stopper 162 pressed against the side wall of the annular groove 165 is prevented from being disengaged from the annular groove 165 and held in the engaged state by friction acting upon a contact surface 162a which gets in contact with the side wall of the stopper housing recess 164 of the drive side clutch member 142 and a contact surface 162b which gets in contact with the side wall of the annular groove 165. Thereafter, when the load on the driven side is reduced as the rotation speed increases and the drive side clutch member 142 is moved back toward the driven side clutch member 143 by the biasing force of the clutch spring 144, so that the above-described friction is no longer produced, as shown in FIG. 22(B), the stopper 162 is moved out of the annular groove 165 by centrifugal force. As a result, prevention of movement or speed change of the drive side clutch member 142 by the stopper 162 is released, so that the drive side clutch member 142 is allowed to shift from the power transmission state to the power transmission interrupted state according to the load applied to the blade 113. FIG. 22(B) shows the drive side clutch member 142 shifted from the power transmission state to the power transmission interrupted state.

Specifically, by provision of the speed change preventing mechanism 161 according to this embodiment, the stopper 162 can be held in engagement with the annular groove 165 by utilizing friction applied to the side of the stopper 162 at the time of startup of the driving motor 115. Therefore, speed change at the time of startup of the motor can be prevented even if the compression coil spring 163 for biasing the stopper 162 onto the annular groove 165 comprises a spring having a weak biasing force by which the stopper 162 is retained at most so as not to be disengaged from the annular groove 165.

Figure 23:
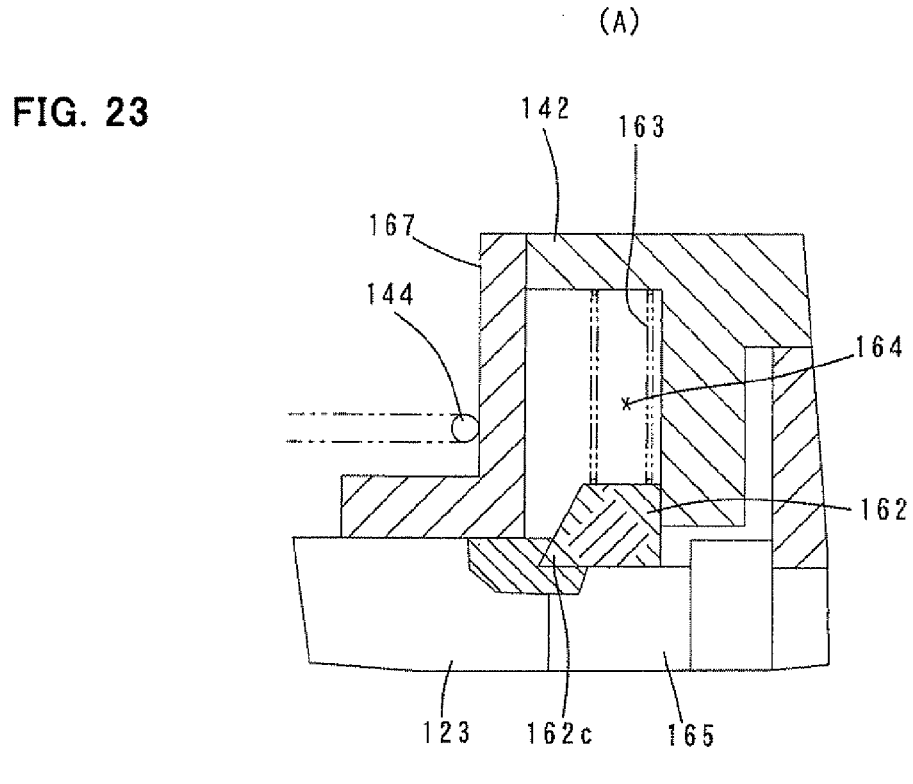
FIG. 23 shows a modification relating to speed change prevention by the stopper.
Figure 23:
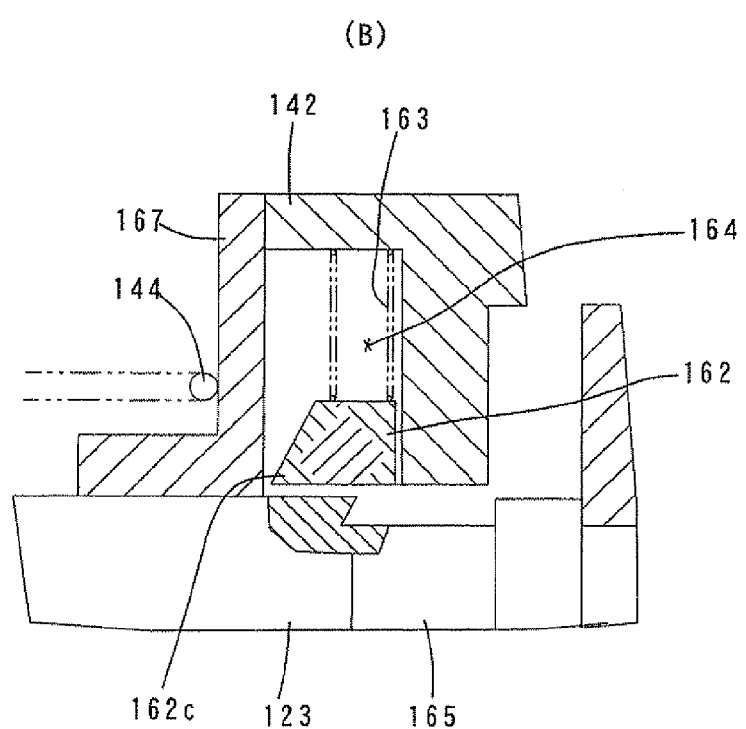

FIG. 23 shows modification 1 relating to speed change prevention at the time of startup of the motor by using the stopper 162. Modification 1 is designed to provide more secure speed change prevention by the stopper 162. One side of the stopper 162 (which comes in contact with the side wall of the annular groove 165 when the drive side clutch member 142 is moved away from the driven side clutch member 143) and the side wall of the annular groove 165 which faces the one side of the stopper 162 have respective inclined surfaces, so that the stopper 162 has an undercut 162c formed as an interference region. In such a configuration, however, the annular groove 165 is formed to have such a width (length in the longitudinal direction) that the undercut 162c of the stopper 162 can be allowed to be disengaged from the annular groove 165. Specifically, the width of the annular groove 165 is set such that the stopper 162 engaged with the annular groove 165 is allowed to move with respect to the annular groove 165 in the longitudinal direction within the range in which the drive side clutch member 142 is held in engagement with the driven side clutch member 143.

As shown in FIG. 23(A), at the time of startup of the driving motor 115, the undercut 162c of the stopper 162 is held in contact with the inclined surface of the annular groove 165 by the driven side load. Thereafter, when the load on the driven side is reduced and the undercut 162c of the stopper 162 is separated from the inclined surface of the annular groove 165 by the clutch spring 144, the stopper 162 is moved out of the annular groove 165 by centrifugal force. As a result, speed change prevention by the stopper 162 is released, so that the drive side clutch member 142 is allowed to shift from the power transmission state to the power transmission interrupted state according to the load applied to the blade 113. FIG. 23(B) shows the state of the drive side clutch member 142 shifted from the power transmission state to the power transmission interrupted state.

Thus, according to modification 1 in which the stopper 162 is provided with the undercut 162c, a greater friction is applied to the undercut 162c, so that speed change prevention at the time of startup of the motor can be further secured.

Figure 24:
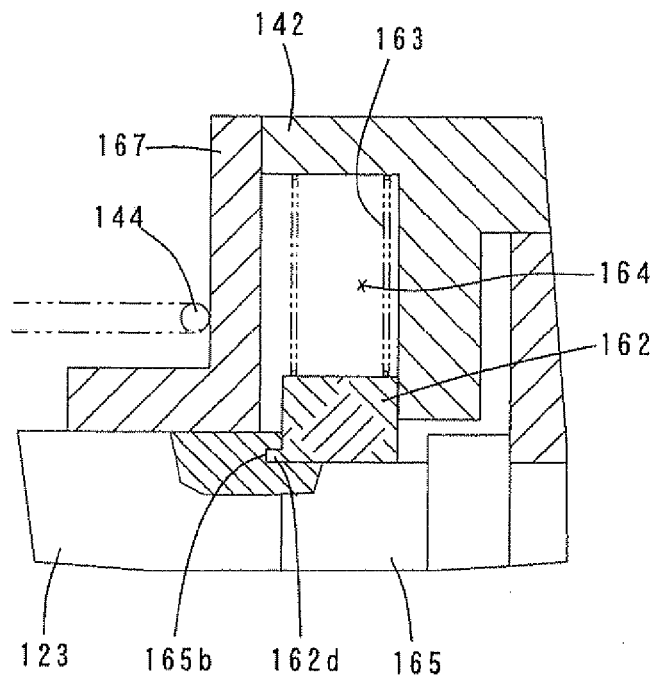
FIG. 24 shows a modification relating to speed change prevention by the stopper.
Figure 24:
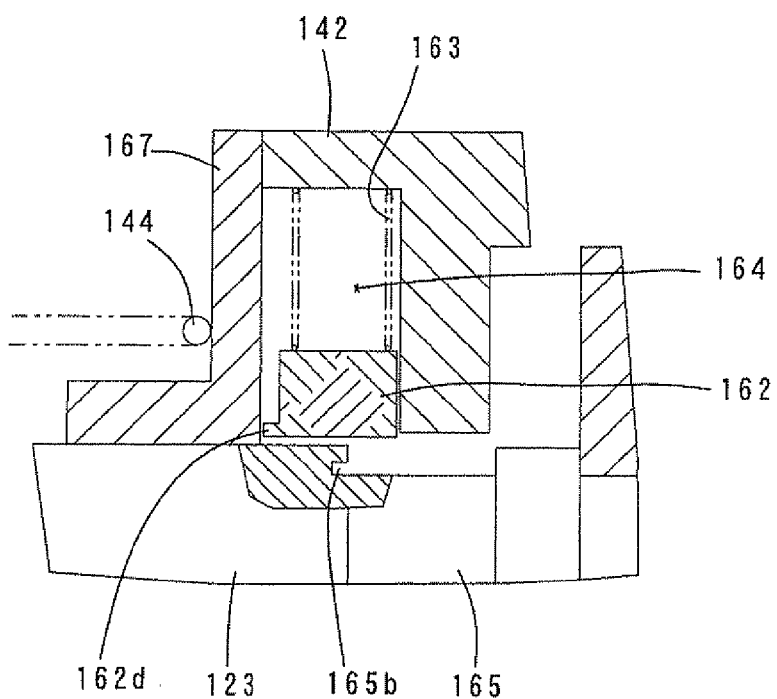

FIG. 24 shows modification 2 relating to speed change prevention at the time of startup of the motor by using the stopper 162. Modification 2 is designed to provide further more secure speed change prevention by the stopper 162. Specifically, a generally L-shaped protrusion 162d having a surface generally parallel to the axis of the intermediate shaft 123 is formed on one side of the stopper 162 (which comes in contact with the side wall of the annular groove 165 when the drive side clutch member 142 is moved away from the driven side clutch member 143), and a recess 165b for receiving the protrusion 162d is formed in the side wall of the annular groove 165 which faces the one side of the stopper 162. Thus, the stopper 162 is formed with an undercut. Therefore, in modification 2, like in modification 1, the annular groove 165 is formed to have such a width (length in the longitudinal direction) that the protrusion 162d of the stopper 162 can be allowed to be disengaged from the annular groove 165.

As shown in FIG. 24(A), at the time of startup of the driving motor 115, the protrusion 162d of the stopper 162 is engaged in the recess 165b of the annular groove 165 by the driven side load. Thereafter, when the load on the driven side is reduced and the protrusion 162d of the stopper 162 is disengaged from the recess 165b of the annular groove 165 as the drive side clutch member 142 is moved toward the driven side clutch member 143 by the clutch spring 144, the stopper 162 is moved out of the annular groove 165 by centrifugal force. As a result, speed change prevention by the stopper 162 is released, so that the drive side clutch member 142 is allowed to shift from the power transmission state to the power transmission interrupted state according to the load applied to the blade 113. FIG. 24(B) shows the state of the drive side clutch member 142 shifted from the power transmission state to the power transmission interrupted state.

Thus, according to modification 2 providing the undercut in the form of the protrusion 162d having a surface generally parallel to the axis of the intermediate shaft 123 on the stopper 162, centrifugal force acting upon the stopper 162 is applied to a surface of the stopper 162 generally perpendicular to the direction of action of the centrifugal force, so that speed change prevention at the time of startup of the motor can be further more secured.

Fifth Embodiment of the Invention

Figure 25:
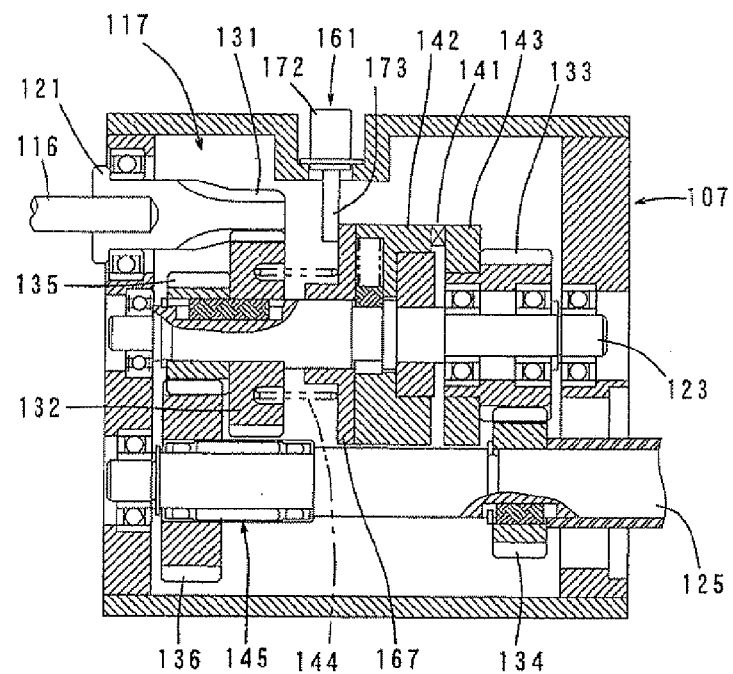
FIG. 25 is a developed sectional view of a speed change preventing mechanism according to a fifth embodiment of the invention, in a speed change prevented state.
Figure 26:
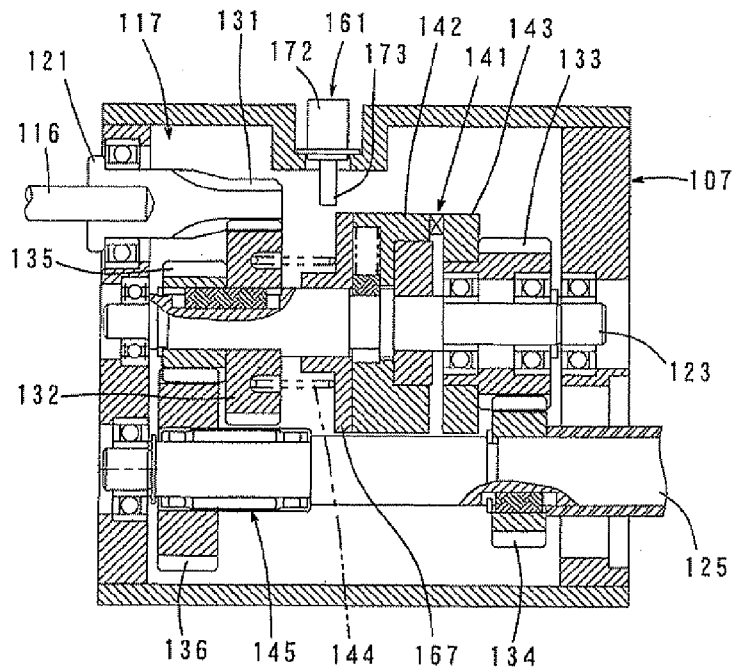
FIG. 26 is also a developed sectional view of the speed change preventing mechanism in a speed change allowed state.

A fifth embodiment of the invention is now explained with reference to FIGS. 25 and 26. This embodiment is a modification relating to the speed change preventing mechanism 161 which prevents the torque transmission path of the speed change mechanism 117 from switching by inertia of the blade 113 at rest. This embodiment is of an electromagnetic solenoid type and constructed such that, for example, a microcomputer is executed to activate an electromagnetic solenoid to release the speed change prevention after a lapse of a predetermined time. As shown in FIGS. 25 and 26, the speed change preventing mechanism 161 according to this embodiment mainly includes an electromagnetic solenoid 171 and a stopper 172 which is activated by the electromagnetic solenoid 171. The electromagnetic solenoid 171 is mounted, for example, on the gear housing 107. The stopper 172 is linearly moved by the electromagnetic solenoid 171. When the electromagnetic solenoid 171 is in an unexcited state (a de-energized state), the stopper 172 protrudes radially inward of the drive side clutch member 142 by the biasing force of a spring which is not shown, and engages (contacts) with a side of the drive side clutch member 142 on the clutch spring 144 side which is held in the power transmission position by the biasing force of the clutch spring 144, or with the side of the cover 167. Thus, the drive side clutch member 142 is prevented from moving from the power transmission position to the power transmission interrupted position. This state is shown in FIG. 25.

When a predetermined time elapses since the driving motor 115 is started, for example, a microcomputer is executed to energize (drive) the electromagnetic solenoid 171 so that the stopper 172 is moved radially outward of the drive side clutch member 142 and disengaged from the cover 167. This state is shown in FIG. 26. Thus, the drive side clutch member 142 is allowed to shift from the power transmission state to the power transmission interrupted state according to the load applied to the blade 113. This embodiment is described as being constructed such that the electromagnetic solenoid 171 is energized when a predetermined time elapses since the driving motor 115 is started, but it may be constructed such that a sensor for detecting the rotation speed of the driving motor 115 is provided and the electromagnetic solenoid 171 is energized based on a detected signal indicating that the rotation speed of the driving motor 115 is increased to a rotation speed.

Thus, by provision of the speed change preventing mechanism 161 according to this embodiment, like in the above-described first embodiment, the speed change mechanism 117 can be prevented from causing such a malfunction that it switches from the first power transmission path P1 to the second power transmission path P2 by inertia of the blade 113 at the time of startup of the driving motor 115.

Sixth Embodiment of the Invention

A sixth embodiment of the invention is now explained with reference to FIGS. 27 and 28. This embodiment is a further modification relating to the speed change preventing mechanism 161. In this embodiment, a motor control circuit 175 for controlling the driving motor 115 has a soft starting function, so that the output shaft 125 (the blade 113) is slowly rotated at the time of startup of the driving motor 115 and thereby the inertial torque at the time of startup is reduced.

Figure 27:
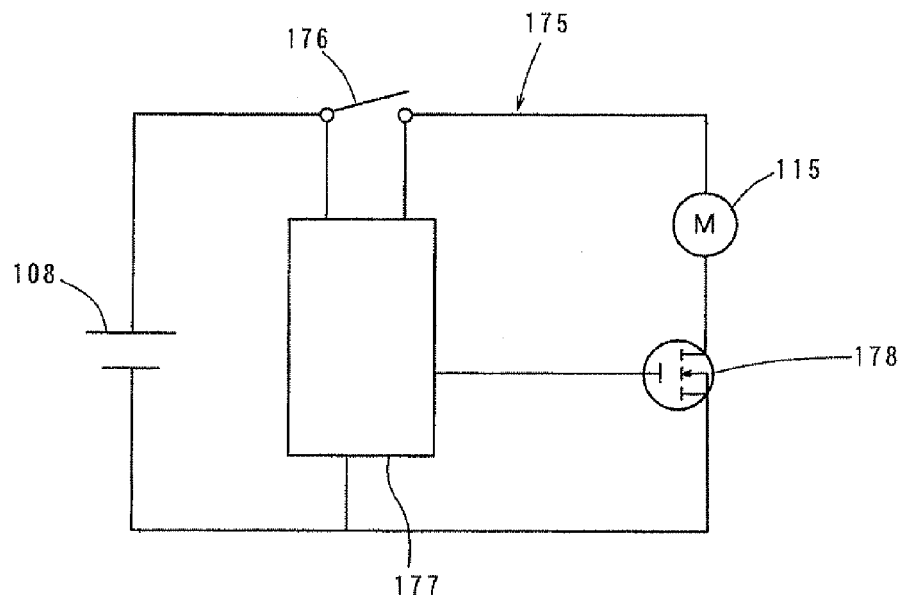
FIG. 27 shows a motor control circuit having a soft starting function as one means of the speed change preventing mechanism according to a sixth embodiment of the invention.
Figure 28:
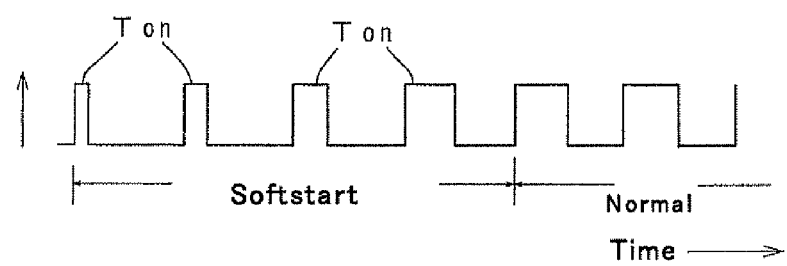
FIG. 28 is a view for illustrating the voltage application time control of a control section in the motor control circuit.

FIG. 27 shows the motor control circuit 175 which allows soft starting of the driving motor 115. The motor control circuit 175 is a feature that corresponds to the "motor control device" according to this invention. The motor control circuit 175 mainly includes a direct current power source (battery 108), a starting switch 176 for directing the startup of the driving motor 115, a control section 177, and a switching element 178 (an FET transistor is used in this embodiment, but the switching element is not limited to this) for controlling the power supply to the driving motor 115.

The starting switch 176 is turned on by depressing the trigger 109a. When the starting switch 176 is turned on, the control section 177 starts operating and controls to gradually increase the voltage applied to a control terminal (a gate terminal of the FET transistor in this embodiment) of the switching element 178. For example, as shown in FIG. 28, the control section 177 controls to gradually increase time "T on" of voltage application to the control terminal of the switching element 178, so that the amount of current passing through the driving motor 115 gradually increases. Therefore, when the starting switch 176 is turned on, the rotation speed of the driving motor 115 gradually increases, and after a lapse of a predetermined time, it reaches a specified speed. When the rotation speed of the driving motor 115 reaches a specified speed, the time "T on" of application of voltage to the control terminal of the switching element 178 is maintained at a time appropriate to the specified speed. A method of soft starting the driving motor 115 is not limited to such a method.

Thus, according to this embodiment, by soft starting the driving motor 115, the inertial torque of the tool bit in the form of the blade 113 can be reduced at the time of startup of the driving motor 115, so that the speed change mechanism 117 can be prevented from switching from the first power transmission path P1 to the second power transmission path P2.

The speed change mechanism 117 according to this embodiment is described as being of a parallel three-shaft type, but it may be of a two-shaft type having two parallel shafts, or an input shaft and an output shaft. Further, the one-way clutch 145 may be disposed on the intermediate shaft 123 side. Further, in this embodiment, the battery-powered circular saw 101 is described as a representative example of a power tool according to the invention, but it is not limited to this. This invention can also be applied to an AC-powered circular saw instead of the battery-powered circular saw, or to a tabletop circular saw and a tabletop slide circular saw which perform a cutting operation on a workpiece placed on a table on a base, instead of the hand-held circular saw as shown in the drawings, and also to a circular saw for woodworking or metalworking. It can also be applied to cutting tools other than circular saws, such as an electric cutter, and a cutting tool having a reciprocating tool bit, such as a reciprocating saw and a jigsaw. Moreover, it can be widely applied to power tools other than cutting tools, such as a sander and a grinder which perform grinding or polishing operation on a workpiece by a rotating sanding disc or grinding wheel, a driver and a wrench for tightening operation, various kinds of drills for drilling operation, and a hedge trimmer for trimming a hedge by reciprocating upper and lower blades in opposite directions.

Further, it is effectively applied to a power tool, such as a sander and a diamond core drill, in which a load applied to the tool bit varies in one power tool, for example, with variations in the size of the tool bit used or with variations in workpieces.

Further, in this embodiment, the latching mechanism 151 is provided such that, once the sliding engagement clutch 141 is shifted to a power transmission interrupted state, the shifted state is retained by the latching mechanism 151, but it may be changed to a construction not having the latching mechanism 151.

In view of an aspect of the invention, the following constructions can be provided.

"The power tool, wherein the engagement part comprises an annular groove formed all around the first or second rotating shaft, the annular groove has such a width that the movement preventing member inserted in the annular groove from radially outward is allowed to move with respect to the annular groove in the longitudinal direction of the rotating shaft, and the movement preventing member has an interference region which is engaged with a side wall of the annular groove via a surface of the movement preventing member formed in a direction transverse to the longitudinal direction, at the time of startup of the power source, and thereby interferes with movement of the movement preventing member out of the annular groove."

With this construction, by provision of the interference region on the movement preventing member, prevention of speed change at the time of startup can be further ensured.

"The power tool, wherein, when the sliding side clutch member is moved to the power transmission position after the power source is started, the movement preventing member is moved together with the clutch member in the longitudinal direction so that the interference region is disengaged from the side wall of the annular groove."

With this construction, when the driven side load is reduced with increase of the rotation speed of the power source after the power source is started, the interference region is disengaged from the side wall of the annular groove. Thereafter, the movement preventing member is moved out of the annular groove by the centrifugal force, so that speed change prevention by the movement preventing member can be released.

Seventh Embodiment of the Invention

The speed change mechanism 117 according to this embodiment has a mode switching mechanism 181 for switching (selecting) the speed change mode. The mode switching mechanism 181 is a feature that corresponds to the "mode switching mechanism" according to this invention. The mode switching mechanism 181 can switch according to the load applied to the blade 113 among automatic transmission mode in which the torque transmission path is automatically switched from the first power transmission path P1 to the second power transmission path P2, high speed mode in which the torque transmission path is fixed (limited) to the first power transmission path P1, and low speed mode in which the torque transmission path is fixed (limited) to the second power transmission path P2. The automatic transmission mode, the high speed mode and the low speed mode are features that correspond to the "first transmission mode", the "second transmission mode" and the "third transmission mode", respectively, according to this invention.

Figure 29:
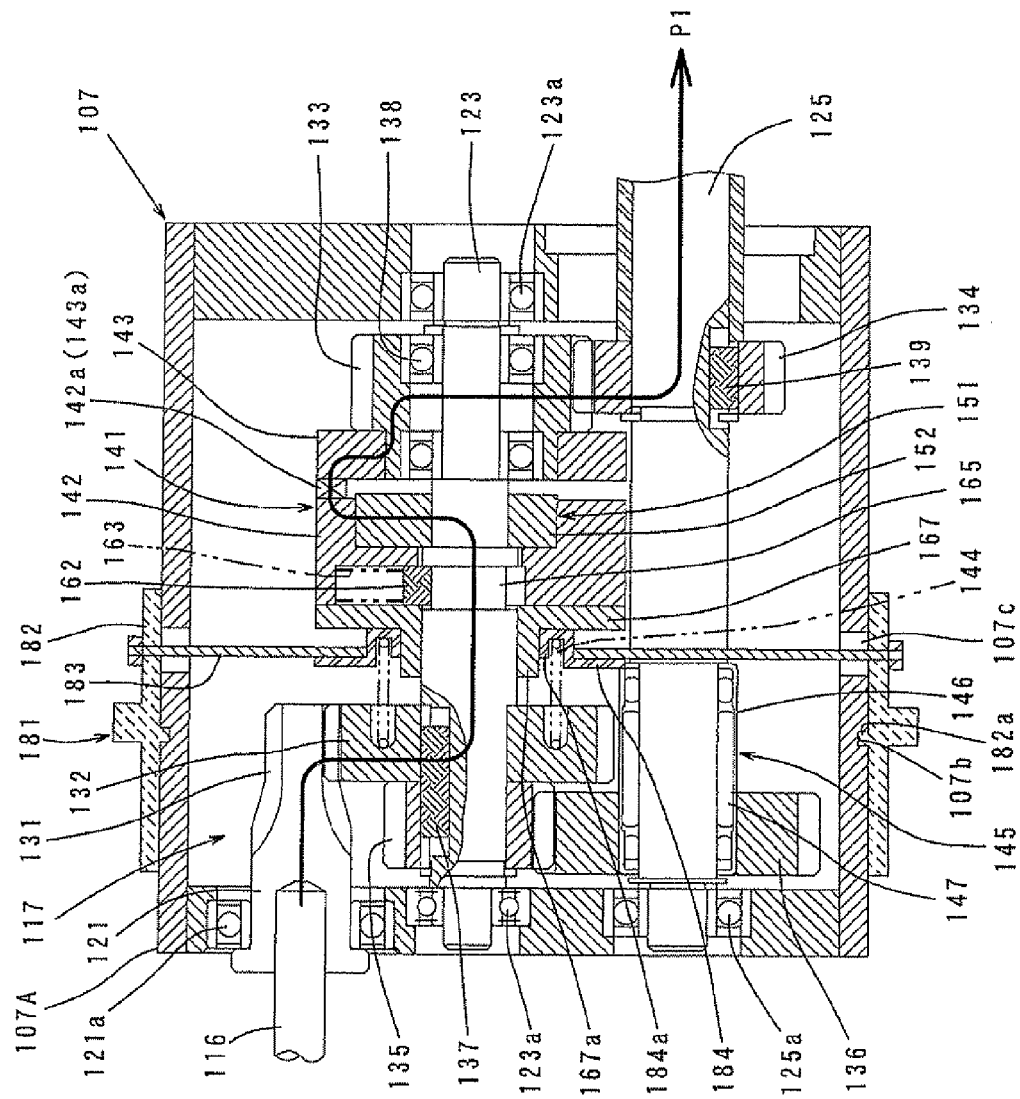
FIG. 29 is a developed sectional view of a parallel three-shaft type speed change mechanism in the state in which the power transmission path is switched to a high-speed low-torque path.
Figure 30:
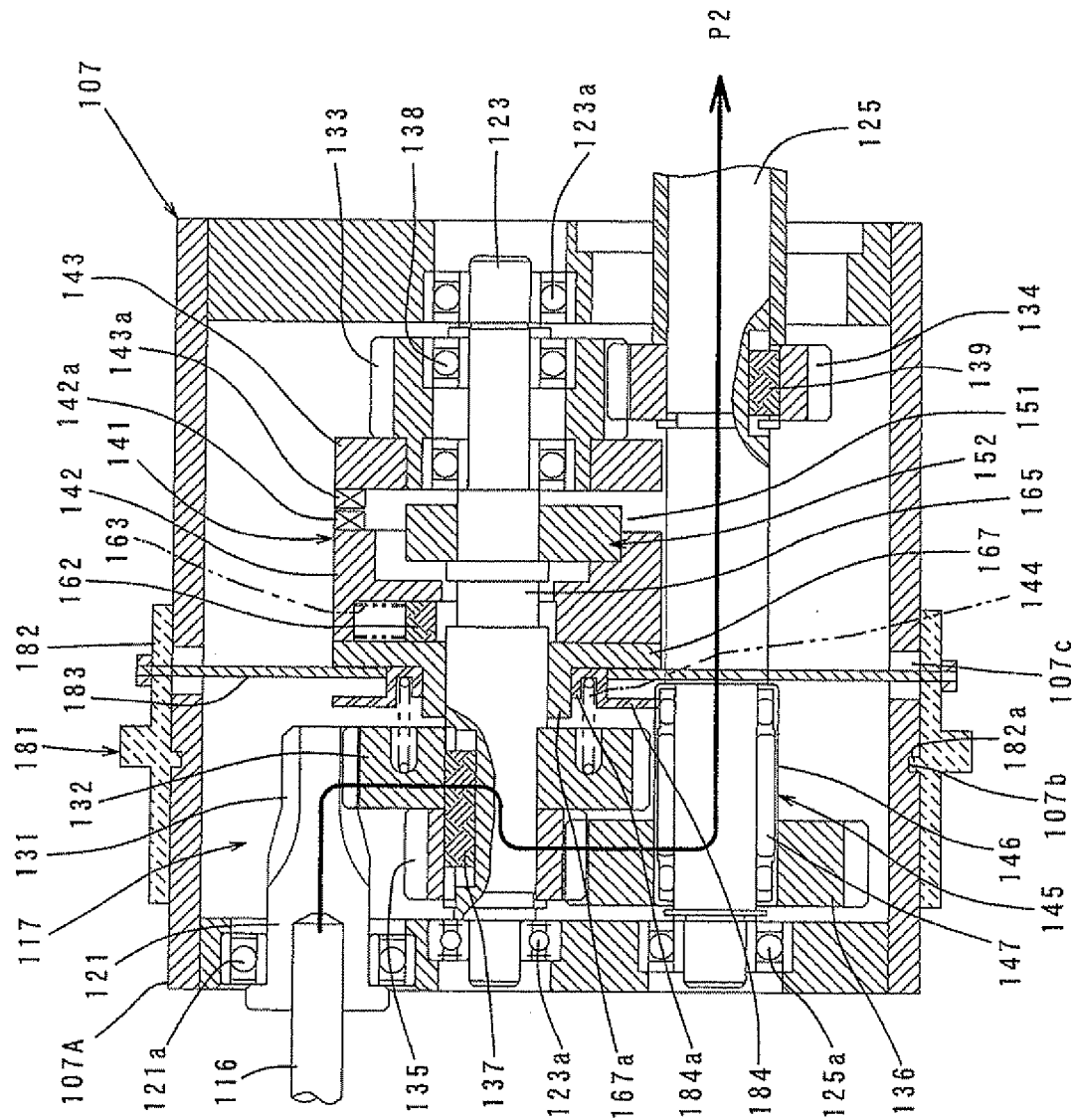
FIG. 30 is a developed sectional view of the parallel three-shaft type speed change mechanism in the state in which the power transmission path is switched to a low-speed high-torque path.
Figure 31:
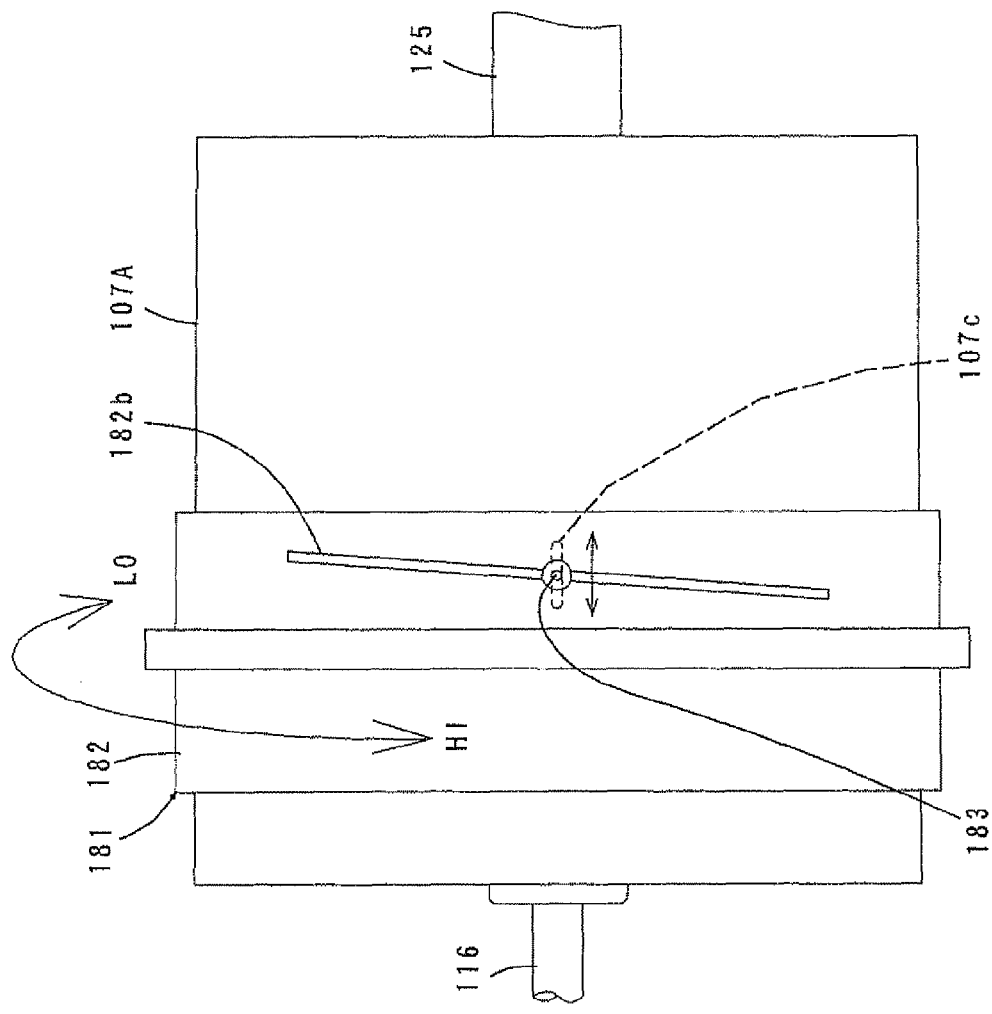
FIG. 31 is an external view showing the mode switching mechanism.
Figure 32:
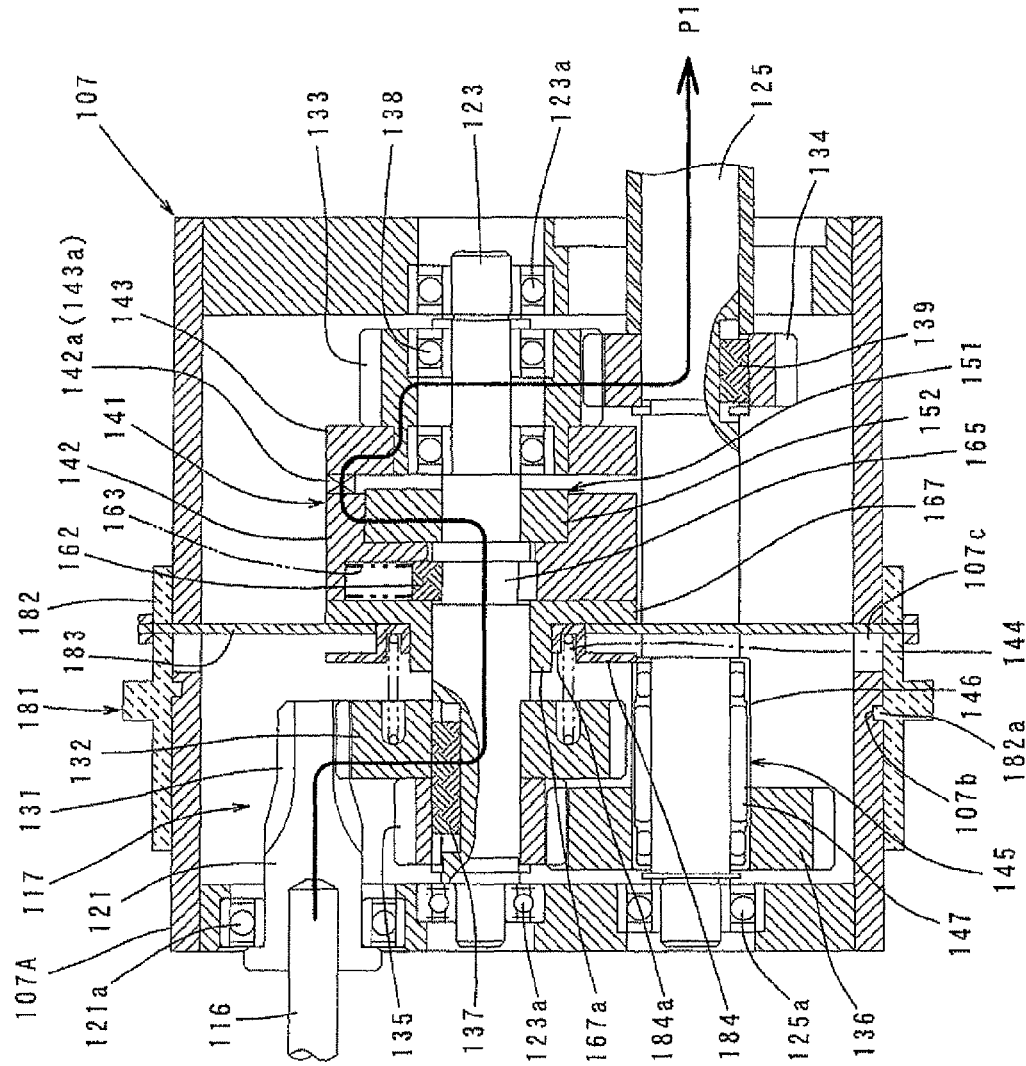
FIG. 32 is a developed sectional view of the mode switching mechanism fixed in the high speed mode.
Figure 33:
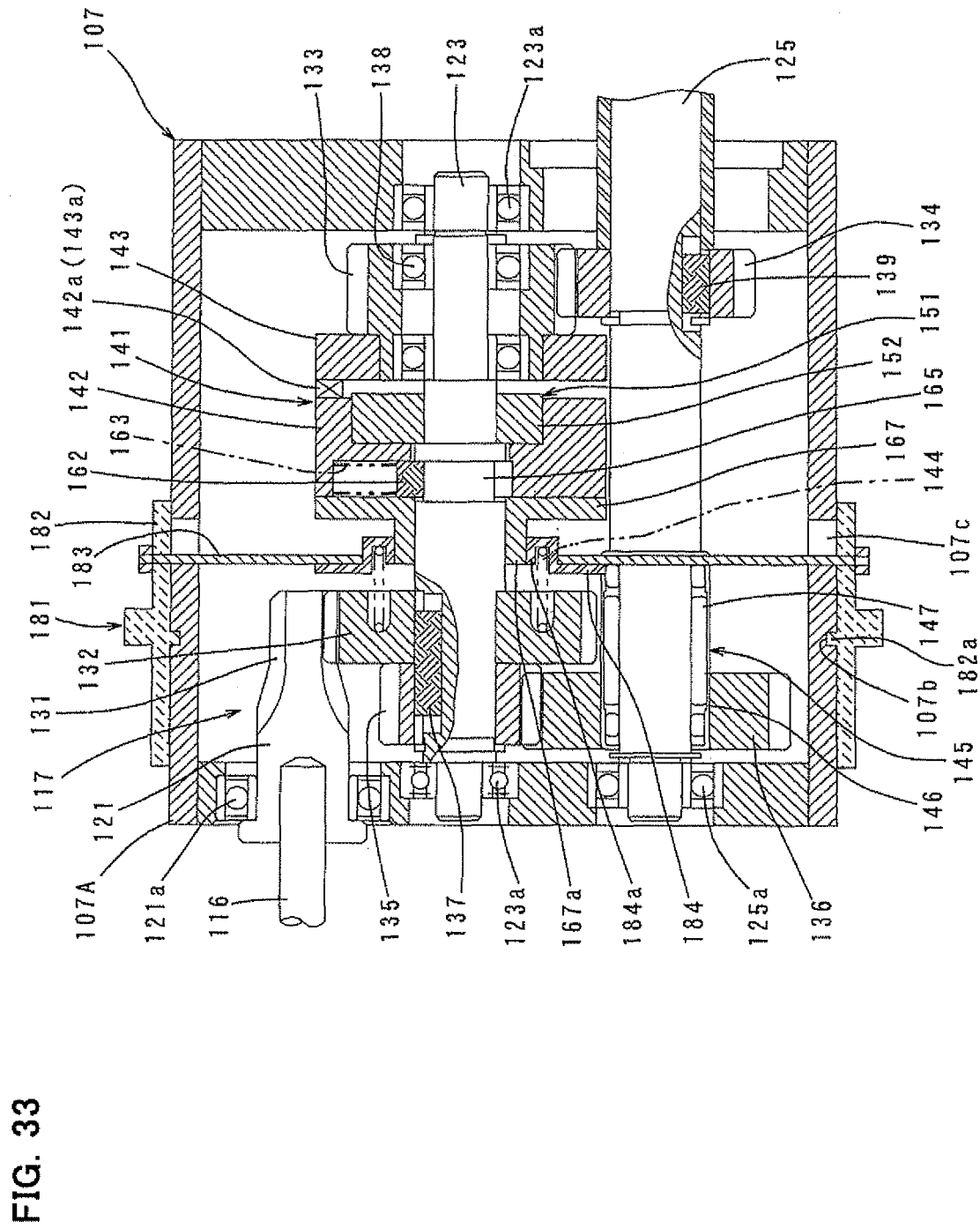
FIG. 33 is a developed sectional view of the mode switching mechanism fixed in the low speed mode, and showing the state before startup of the circular saw.
Figure 34:
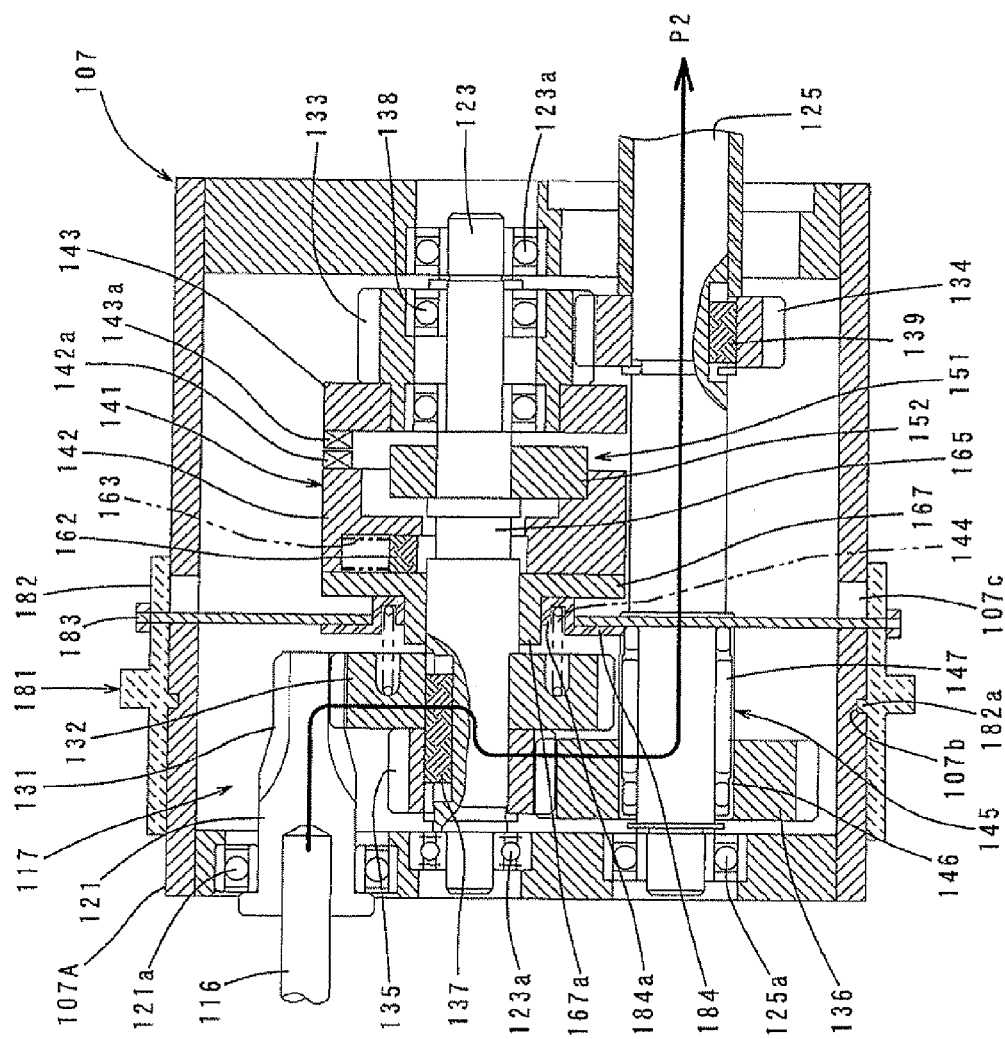
FIG. 34 is a developed sectional view of the mode switching mechanism fixed in the low speed mode, and showing the state after startup of the circular saw.

The mode switching mechanism 181 is now described mainly with reference to FIGS. 29 to 34. FIG. 31 is an external view showing the mode switching mechanism 181, and FIGS. 32 to 34 are developed sectional views thereof. The gear housing 107 has a generally cylindrical inner housing 107A, and the above-described speed change mechanism 117 is housed within the inner housing 107A (see FIGS. 2 and 3). The inner housing 107A is constructed such that its longitudinal direction is parallel to the axial direction of the intermediate shaft 123 in the speed change mechanism 117 and thus to the longitudinal direction of the sliding engagement clutch 141. The mode switching mechanism 181 is mounted to the inner housing 107A.

The mode switching mechanism 181 is substantially designed such that the sliding engagement clutch 141 can be shifted among automatic transmission mode in which it is automatically shifted between the power transmission state and the power transmission interrupted state according to the load applied to the blade 113, high speed mode in which it is fixed in the power transmission state regardless of the magnitude of the load, and low speed mode in which it is fixed in the power transmission interrupted state regardless of the magnitude of the load. The mode switching mechanism 181 mainly includes a mode switching sleeve 182 which is fitted onto the inner housing 107A such that it can rotate in the circumferential direction, and a plurality of (two in this embodiment) rod-like operating members 183 mounted to the mode switching sleeve 182.

A single (or possibly more) guide groove 107b is formed in the outer circumferential surface of the inner housing 107A. A ridge 182a is formed in the inner circumferential surface of the mode switching sleeve 182 and engaged with the guide groove 107b of the inner housing 107A, so that the mode switching sleeve 182 is prevented from moving in the longitudinal direction with respect to the inner housing 107A and in this state it can rotate around its longitudinal axis. The mode switching sleeve 182 can be turned by a user. As for this turning operation, although not shown, it may be constructed, for example, such that the mode switching sleeve 182 is directly operated by user's finger through an opening formed in the gear housing 107, or such that it is operated via a mode switching handle which is integrally formed with the mode switching sleeve 182 and exposed to the outside through an opening of the gear housing 107.

Further, (two) spiral slots (lead grooves) 182b corresponding in number to the operating members 183 are formed in the mode switching sleeve 182 on the same circumference and have a predetermined length in the circumferential direction. One axial end (proximal end) of each of the operating members 183 is slidably engaged in each of the slots 182b. The operating member 183 radially extends through a longitudinally extending slot 107c formed through the inner housing 107A and toward the middle of the intermediate shaft 123 within the inner housing 107A. Specifically, the operating member 183 is prevented from moving in the circumferential direction by the slot 107c, and in this state, it is allowed to move in the longitudinal direction along the slot 107c. Therefore, when the mode switching sleeve 182 is turned in one direction or the other direction, the operating member 183 slidably engaged in the associated slot 182b moves in one or the other longitudinal direction along the slot 107c of the inner housing 107A. By utilizing this movement (displacement) of the operating member 183 in the longitudinal direction, the operating conditions of the engagement clutch 141 are shifted. The position of the rotating end of the mode switching sleeve 182 turned in a direction LO in FIG. 31 is defined as a position of low speed mode, the rotating end of the mode switching sleeve 182 turned in a direction HI is defined as a position of high speed mode, and an intermediate position between the two positions is defined as a position of automatic transmission mode.

The distal end of the operating member 183 is inserted between the side of a spring receiving ring 184 for receiving one end of the clutch spring 144 and the side of the cover 167 fixed to the drive side clutch member 142. A cylindrical portion 184a is formed in the middle of the spring receiving ring 184 and protrudes in the longitudinal direction. The cylindrical portion 184a of the spring receiving ring 184 is loosely fitted onto a cylindrical portion 167a formed in the middle of the cover 167 and can move in the longitudinal direction with respect to the cylindrical portion 167a. Further, the end surface of the cylindrical portion 184a is in contact with the side of the cover 167. Thus, the biasing force of the clutch spring 144 is applied to the side of the drive side clutch member 142 via the cover 167. A predetermined space is formed between the side of the spring receiving ring 184 and the side of the cover 167 which face each other, and the distal end of the operating member 183 is inserted in the space.

The mode switching mechanism 181 according to this embodiment is constructed as described above. Therefore, when the mode switching sleeve 182 is placed, for example, in the position of automatic transmission mode, the distal end of the operating member 183 is moved toward the side of the spring receiving ring 184 and away from the side of the cover 167. The distance between the distal end of the operating member 183 and the side of the cover 167 in the longitudinal direction is set such that the drive side clutch member 142 can be disengaged from the driven side clutch member 143, or such that the cams 142a of the drive side clutch member 142 are allowed to be separated from the cams 143a of the driven side clutch member 143. This state is shown in FIGS. 29 and 30.

Thus, when the automatic transmission mode is selected, the sliding engagement clutch 141 can be operated as usual. Therefore, during operation on a workpiece by the circular saw 101, the power transmission path can be automatically switched according to the load applied to the blade 113.

When the mode switching sleeve 182 is switched to the position of high speed mode, the distal end of the operating member 183 comes in contact with the side of the cover 167 of the drive side clutch member 142 placed in the power transmission position. This state is shown in FIG. 32. When the distal end of the operating member 183 is in contact with the side of the cover 167, during operation of the circular saw 101, the operating member 183 prevents the drive side clutch member 142 from moving in the clutch releasing direction, so that the sliding engagement clutch 141 is continuously held in the engaged state regardless of fluctuations of the load applied to the blade 113. Therefore, as described above, the torque of the driving motor 115 is transmitted to the blade 113 via the first power transmission path P1 passing through the sliding engagement clutch 141. Specifically, when the high speed mode is selected, the speed change mechanism 117 is fixed to the first power transmission path P1, and in this state, the blade 113 can be driven at high speed and low torque.

When the mode switching sleeve 182 is switched to the position of low speed mode, the distal end of the operating member 183 pushes the side of the spring receiving ring 184 away from the side of the cover 167. At this time, the distance between the end surface of the cylindrical portion 184a of the spring receiving ring 184 and the side of the cover 167 is set such that the drive side clutch member 142 can be disengaged from the driven side clutch member 143, and the drive side clutch member 142 is no longer acted upon by the biasing force of the clutch spring 144. This state is shown in FIG. 33.

In this state, when the circular saw 101 is driven and the cams 142a of the drive side clutch member 142 are subjected to the load from the cams 143a of the driven side clutch member 143, the drive side clutch member 142 is retracted to the power transmission interrupted position. Further, the cams 142a are held in the power transmission interrupted position in which the cams 142a are separated from the cams 143a of the driven side clutch member 143, by the action of the above-described torque ring 152. This state is shown in FIG. 34. Therefore, as described above, the torque of the driving motor 115 is transmitted to the blade 113 via the second power transmission path P2 passing through the one-way clutch 145. Specifically, when the low speed mode is selected, the speed change mechanism 117 is fixed to the second power transmission path P2, and in this state, the blade 113 can be driven at low speed and high torque.

Thus, by provision of the mode switching mechanism 181 according to this embodiment, the mode of the speed change mechanism 117 can be appropriately selected according to the thickness (cutting depth) or hardness of the workpiece, among the high speed mode in which the blade 113 is driven at high speed and low torque, the low speed mode in which it is driven at low speed and high torque, and the automatic transmission mode in which the transmission path is automatically switched between the high-speed and low-torque path and the low-speed and high-torque path. Thus the mode can be selected in accordance with the purpose, so that the convenience can be improved.

Eighth Embodiment of the Invention

Figure 35:
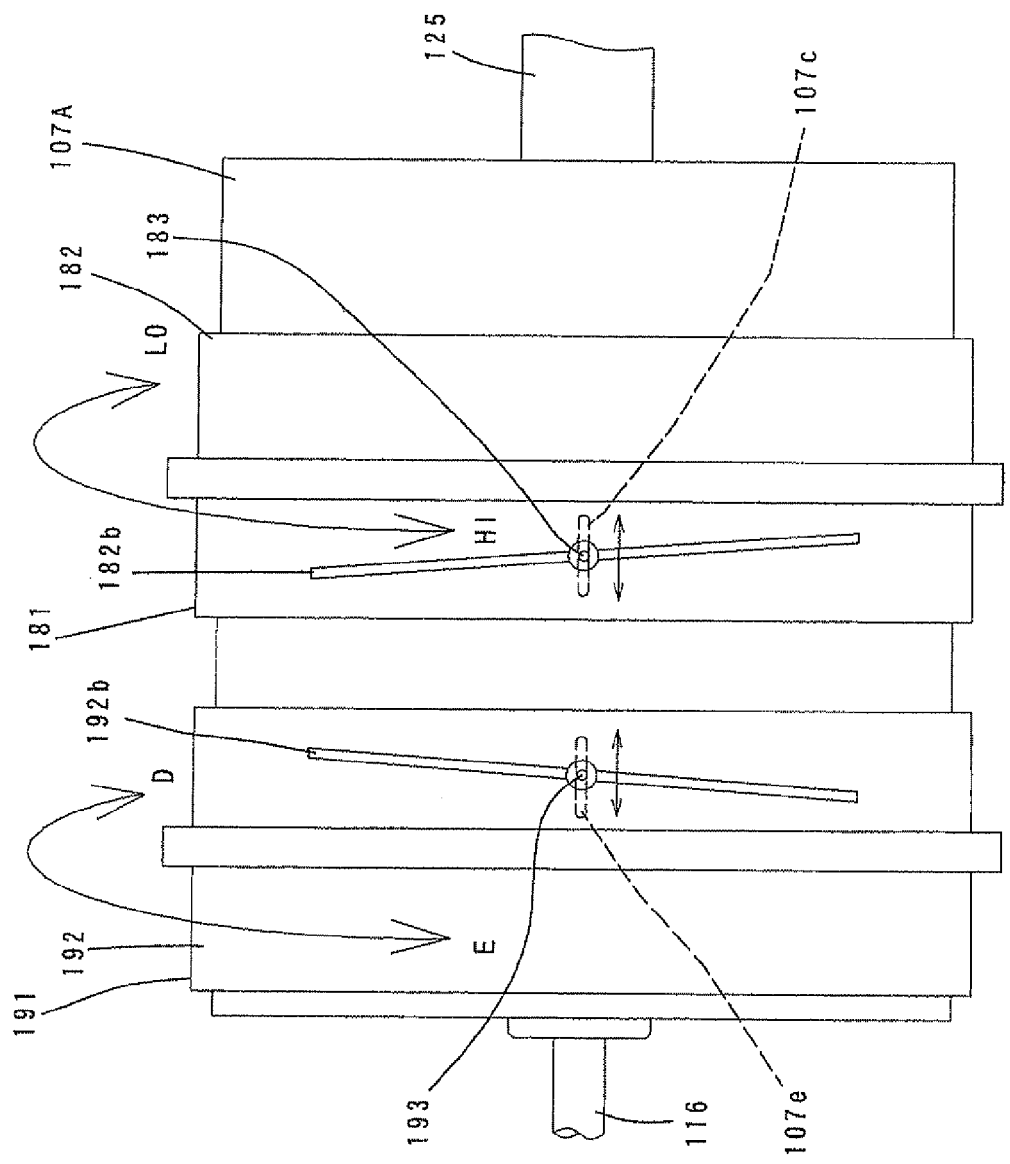
FIG. 35 is an external view showing the mode switching mechanism and a speed-change torque adjusting mechanism according to an eighth embodiment of the invention.
Figure 36:
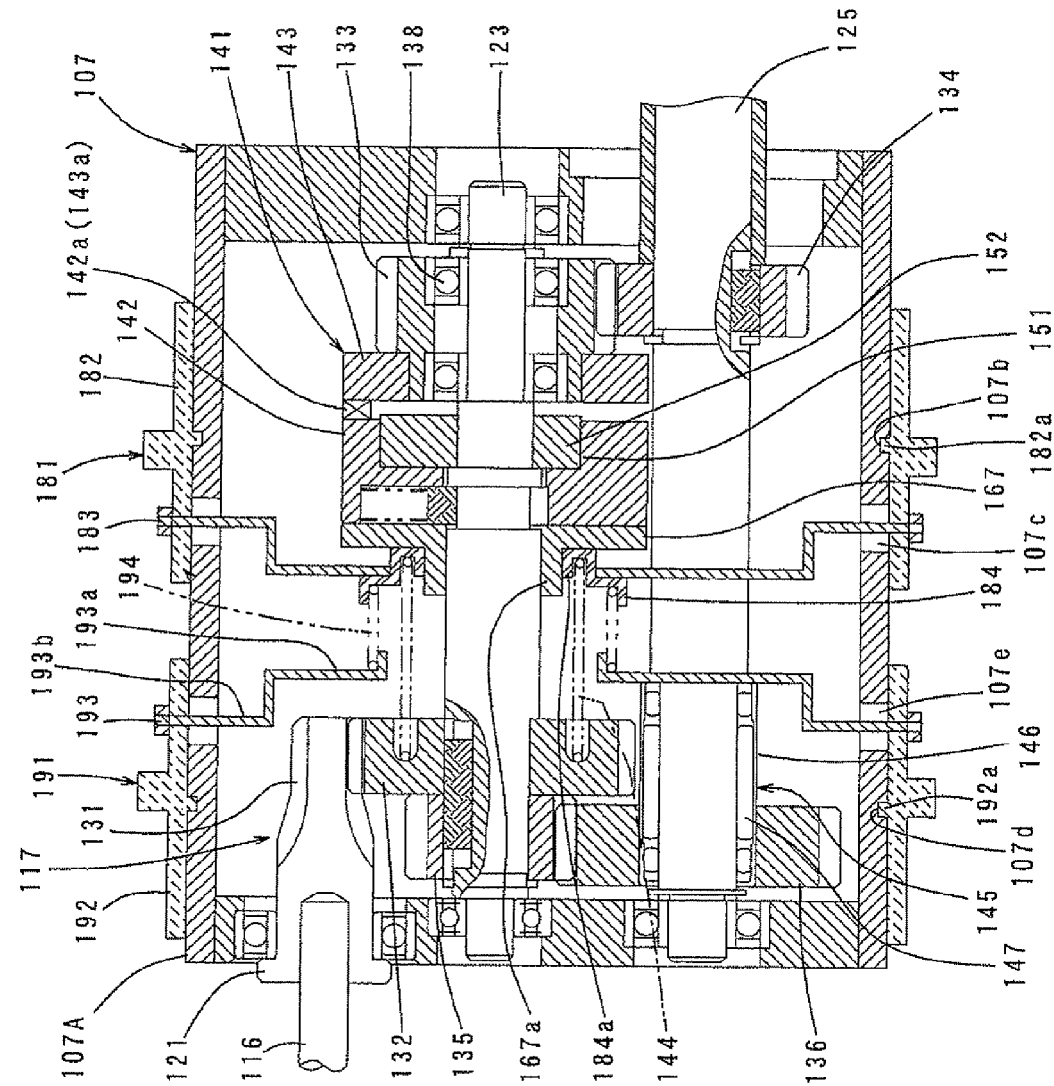
FIG. 36 is a developed sectional view also showing the mode switching mechanism and the speed-change torque adjusting mechanism.

An eighth embodiment of the invention is now explained with reference to FIGS. 35 and 36. FIG. 35 is an external view showing the mode switching mechanism 181 and a speed-change torque adjusting mechanism 191, and FIG. 36 is a developed sectional view thereof. In this embodiment, the speed-change torque adjusting mechanism 191 is provided which allows the user to arbitrarily adjust a switching set value for speed change (speed-change torque value) at which switching from the first power transmission path P1 to the second power transmission path P2 is effected. In the other points, this embodiment has the same construction as the above-described first embodiment. Therefore, components shown in FIGS. 35 and 36 are given like numerals as in the first embodiment and will not be described or briefly described. The speed-change torque adjusting mechanism 191 is disposed in juxtaposition with the above-described mode switching mechanism 181, and it functions when the automatic transmission mode is selected by the mode switching mechanism 181. The speed-change torque adjusting mechanism 191 is a feature that corresponds to the "switching set value adjusting mechanism" according to this invention.

The speed-change torque adjusting mechanism 191 is substantially designed to adjust the biasing force of a spring of the sliding engagement clutch 141 which defines the switching set value. In this embodiment, in addition to the existing clutch spring 144, an auxiliary clutch spring 194 is further provided, and the biasing force of the auxiliary clutch spring 194 can be adjusted. The speed-change torque adjusting mechanism 191 mainly includes a speed-change torque adjusting sleeve 192, and a spring receiving member 193 for adjusting the biasing force which is mounted to the speed-change torque adjusting sleeve 192. The speed-change torque adjusting sleeve 192 and the spring receiving member 193 are features that correspond to the "adjusting member" according to this invention.

Like the mode switching sleeve 182, the speed-change torque adjusting sleeve 192 is fitted onto the inner housing 107A such that it is prevented from moving in the longitudinal direction via a ridge 192a engaged in a guide groove 107d formed in the inner housing 107A and in this state it can rotate around its longitudinal axis. The spring receiving member 193 includes a spring receiving disc 193a which serves to receive one end of the auxiliary clutch spring 194 and a plurality of (two in this embodiment) arms 193b extending radially outward from the spring receiving disc 193a. Like the operating member 183, an end of each of the arms 193b extends through a longitudinally extending slot 107e formed through the inner housing 107A and is slidably engaged in each of spiral slots (lead grooves) 192b formed in the speed-change torque adjusting sleeve 192. Therefore, when the speed-change torque adjusting sleeve 192 is rotated in one direction or the other direction, the spring receiving member 193 slidably engaged in the associated slot 192b moves in one or the other longitudinal direction along the slot 107e of the inner housing 107A. By utilizing this movement (displacement) of the spring receiving member 193 in the longitudinal direction, the biasing force of the auxiliary clutch spring 194 is adjusted. The auxiliary clutch spring 194 is disposed between the spring receiving disc 193a of the spring receiving member 193 and the spring receiving ring 184 and biases the drive side clutch member 142 toward the power transmission position via the spring receiving ring 184.

Further, it is constructed such that the speed-change torque adjusting sleeve 192 can be turned in the same manner as the mode switching sleeve 182.

The speed-change torque adjusting mechanism 191 according to this embodiment is constructed as described above. Therefore, when the automatic transmission mode is selected by the mode switching mechanism 181 and the speed-change torque adjusting sleeve 192 is turned in a direction D in FIG. 35, the spring receiving member 193 moves away from the spring receiving ring 184 so that the biasing force of the auxiliary clutch spring 194 is reduced. When the speed-change torque adjusting sleeve 192 is turned in a direction E in FIG. 35, the spring receiving member 193 moves toward the spring receiving ring 184 so that the biasing force of the auxiliary clutch spring 194 is increased.

Thus, by provision of the speed-change torque adjusting mechanism 191 according to this embodiment, the user can arbitrarily adjust the switching set value for speed change, at which switching from the first power transmission path P1 to the second power transmission path P2 is effected, by adjusting the biasing force of the auxiliary clutch spring 194 of the sliding engagement clutch 141. Further, in this embodiment, the speed-change torque adjusting sleeve 192 is adjusted by turning like a screw via the guide groove 107d. With this construction, the switching set value for speed change can be steplessly adjusted, so that fine adjustment can be realized.

DESCRIPTION OF NUMERALS 101 circular saw (power tool)
103 circular saw body (power tool body)
104 blade case
105 motor housing
106 safety cover
107 gear housing
107L lower end surface
107a latch mounting region
108 battery
109 handgrip
109a trigger
111 base
111a opening
113 blade
115 driving motor
116 motor shaft
117 speed change mechanism
121 input shaft
121a bearing
123 intermediate shaft (first rotating shaft)
123a bearing
125 output shaft (second rotating shaft)
125a bearing
131 pinion gear
132 first intermediate gear
133 second intermediate gear
134 first driven gear
135 third intermediate gear
136 second driven gear
137 key
138 bearing
139 key
141 sliding engagement clutch (first clutch)
142 drive side clutch member
142a cam
143 driven side clutch member
143a cam
144 clutch spring
145 one-way clutch (second clutch)
146 outer ring
146a cam groove
146b cam face
147 needle roller
148 spring
151 latching mechanism (switching retaining mechanism)
152 torque ring (latching member)
152a protrusion
153 housing space (recess)
153a engagement recess
153b torque transmission surface
153c inclined surface
153d stopper surface
161 speed change preventing mechanism
162 stopper
163 compression coil spring
164 stopper housing recess
165 annular groove
166 guide pin 167 cover
251 latching mechanism (switching retaining mechanism)
252 ball (latching member)
253 slide block
253a slide surface
253b notch
254 compression coil spring (biasing member)
255 ball retaining hole
256 curved surface (engagement part)

The invention claimed is:

1. A power tool comprising a power source, a speed change mechanism and a tool bit which is driven by the power source via the speed change mechanism so as to perform a predetermined operation, wherein:
the speed change mechanism comprises first and second rotating shafts and first and second gear trains, the first and second rotating shafts being disposed parallel to each other, the first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path, wherein the speed change mechanism further includes a first clutch which allows and interrupts power transmission on the first power transmission path and a second clutch which allows and interrupts power transmission on the second power transmission path,
the power transmission path is switched between the first and second power transmission paths while the first and second gear trains are held engaged, by shifting of the first and second clutches between the power transmission state and the power transmission interrupted state according to a load applied to the tool bit, and
the speed change mechanism includes a switching retaining mechanism, and when the power transmission path is switched between the first and second power transmission paths, the switching retaining mechanism retains the shifted state until the power source is stopped.

2. The power tool according to claim 1, wherein:
at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other, and
the switching retaining mechanism includes a latching member, and when the drive side clutch member or the driven side clutch member is moved to the power transmission interrupted position, the latching member is engaged with the moved sliding side clutch member and thereby retains the sliding side clutch member in the power transmission interrupted state.

3. The power tool according to claim 2, wherein:
a recess is formed in a side of the sliding side clutch member, and
the latching member is fixed to the first or second rotating shaft and housed in the recess such that the latching member cannot move in a circumferential direction with respect to the recess, and thereby transmits torque between the first or second rotating shaft and the sliding side clutch member, and when the sliding side clutch member is moved to the power transmission interrupted state, the latching member is moved out of the recess by the movement of the sliding side clutch member, and moved with respect to the sliding side clutch member in a direction of rotation due to a difference in the rotation speed between the sliding side clutch member and the latching member which is caused by the movement out of the recess, and thus engaged with a side of the sliding side clutch member and thereby retains the sliding side clutch member in the power transmission interrupted position.

4. The power tool according to claim 2, further comprising a gear housing that houses the speed change mechanism, wherein:
an engagement part is formed on an outer circumferential surface of the sliding side clutch member, and
the switching retaining mechanism includes a latching member which is radially movably disposed in the gear housing and comes in contact with the outer circumferential surface of the sliding side clutch member from the radial direction, and a biasing member that biases the latching member in a direction of engagement with the sliding side clutch member, and when the sliding side clutch member is moved to the power transmission interrupted position, the latching member is engaged with the engagement part and thereby retains the moved sliding side clutch member in the power transmission interrupted position.

5. The power tool according to claim 1, further comprising a reset mechanism that returns the switching retaining mechanism to an initial position when the power source is stopped.

6. The power tool according to claim 3, wherein, when a brake is applied to the power source in order to stop the power source, the latching member is returned to the recess due to a difference in the rotation speed which is caused between the sliding side clutch member and the latching member.

7. The power tool according to claim 1, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

8. The power tool according to claim 3, wherein an inclined surface is further formed on the side of the sliding side clutch member and faces a front region of the recess in the rotating direction, and
when the sliding side clutch member is moved to the power transmission interrupted position, the latching member is moved out of the recess by the movement of the sliding side clutch member and climbs on the inclined surface due to a difference in the rotation speed between the sliding side clutch member and the latching member which is caused by the movement out of the recess, thereby further moving the sliding side clutch member from the power transmission interrupted position to an isolated position in which the sliding side clutch member is further separated from an opposed clutch member and retaining the sliding side clutch member in the isolated position.

9. The power tool according to claim 1, wherein the speed change mechanism further includes a switching preventing mechanism which prevents the power transmission path from switching between the first and second power transmission paths by inertia of the tool bit at the time of startup of the power source.

10. A power tool comprising a power source, a speed change mechanism and a tool bit which is driven via the speed change mechanism by the power source and caused to perform a predetermined operation, wherein:
the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path, and further includes a first clutch which allows and interrupts power transmission on the first power transmission path and a second clutch which allows and interrupts power transmission on the second power transmission path,
the power transmission path is switched between the first and second power transmission paths while the first and second gear trains are held engaged, by shifting of the first and second clutches between the power transmission state and the power transmission interrupted state according to a load applied to the tool bit, and
the speed change mechanism further includes a switching preventing mechanism which prevents the power transmission path from switching between the first and second power transmission paths by inertia of the tool bit at the time of startup of the power source.

11. The power tool according to claim 10, wherein:
at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other,
the switching preventing mechanism includes an engagement part which is formed on the first or second rotating shaft, and a movement preventing member which is radially movably formed on the sliding side clutch member, wherein, when the power source is in the stopped state and the sliding side clutch member is placed in the power transmission position, the movement preventing member prevents the clutch member from moving from the power transmission position to the power transmission interrupted position by engagement with the engagement part, and
after the power source is started, the movement preventing member is moved radially outward by centrifugal force acting upon the movement preventing member and thus disengaged from the engagement part, thereby allowing the sliding side clutch member to move from the power transmission position to the power transmission interrupted position.

12. The power tool according to claim 11, wherein the first rotating shaft is defined as a drive side rotating shaft and the second rotating shaft is defined as a driven side rotating shaft, and the sliding engagement clutch and the switching preventing mechanism are disposed on the drive side rotating shaft.

13. The power tool according to claim 11, wherein three such movement preventing members are formed on the sliding side clutch member and equiangularly spaced apart from each other in a circumferential direction.

14. The power tool according to claim 10, wherein:
at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other,
the power tool further includes a gear housing that houses the speed change mechanism,
the switching preventing mechanism includes an electromagnetic solenoid mounted on the gear housing, and a movement preventing member which is moved by the electromagnetic solenoid and prevents the sliding side clutch member from moving from the power transmission position to the power transmission interrupted position by engagement with the sliding side clutch member when the power source is in the stopped state, and
when a predetermined time elapses since the power source is started, the electromagnetic solenoid is energized to move the movement preventing member in a direction of disengagement from the sliding side clutch member and thereby allows the sliding side clutch member to move from the power transmission position to the power transmission interrupted position.

15. The power tool according to claim 10, wherein the power source comprises a motor, and the switching preventing mechanism comprises a motor control device having a soft starting function of controlling such that the rotation speed of the motor gradually increases at the time of startup of the motor.

16. The power tool according to claim 10, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

17. The power tool according to claim 11, wherein:
the engagement part comprises an annular groove formed all around the first or second rotating shaft,
the annular groove has such a width that the movement preventing member inserted in the annular groove from radially outward is allowed to move with respect to the annular groove in the longitudinal direction of the rotating shaft, and
the movement preventing member has an interference region which is engaged with a side wall of the annular groove via a surface of the movement preventing member formed in a direction transverse to the longitudinal direction, at the time of startup of the power source, and thereby interferes with movement of the movement preventing member out of the annular groove.

18. The power tool according to claim 17, wherein, when the sliding side clutch member is moved to the power transmission position after the power source is started, the movement preventing member is moved together with the clutch member in the longitudinal direction so that the interference region is disengaged from the side wall of the annular groove.

19. The power tool according to claim 1, wherein the speed change mechanism further includes a switching set value adjusting mechanism which is operated by a user and adjusts a switching set value at which the transmission path is switched between the first power transmission path and the second power transmission path.

20. The power tool according to claim 1, wherein the speed change mechanism further includes a mode switching mechanism which is operated by a user and switches the transmission mode between a first transmission mode in which a torque transmission path is automatically switched between the first power transmission path and the second power transmission path according to the load applied to the tool bit, and at least one of a second transmission mode in which the first power transmission path is used for torque transmission and a third transmission mode in which the second power transmission path is used for torque transmission.

21. A power tool comprising a power source, a speed change mechanism and a tool bit which is driven via the speed change mechanism by the power source and caused to perform a predetermined operation, wherein:
the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path, and further includes a first clutch which allows and interrupts power transmission on the first power transmission path and a second clutch which allows and interrupts power transmission on the second power transmission path,
the power transmission path is switched between the first and second power transmission paths while the first and second gear trains are held engaged, by shifting of the first and second clutches between the power transmission state and the power transmission interrupted state according to a load applied to the tool bit, and
the speed change mechanism further includes a switching set value adjusting mechanism which is operated by a user and adjusts a switching set value at which the transmission path is switched between the first power transmission path and the second power transmission path.

22. A power tool comprising a power source, a speed change mechanism and a tool bit which is driven via the speed change mechanism by the power source and caused to perform a predetermined operation, wherein:
the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path, and further includes a first clutch which allows and interrupts power transmission on the first power transmission path and a second clutch which allows and interrupts power transmission on the second power transmission path,
the power transmission path is switched between the first and second power transmission paths while the first and second gear trains are held engaged, by shifting of the first and second clutches between the power transmission state and the power transmission interrupted state according to a load applied to the tool bit, and
the speed change mechanism further includes a mode switching mechanism which is operated by a user and switches the transmission mode between a first transmission mode in which a torque transmission path is automatically switched between the first power transmission path and the second power transmission path according to the load applied to the tool bit, and at least one of a second transmission mode in which the first power transmission path is used for torque transmission and a third transmission mode in which the second power transmission path is used for torque transmission.

23. The power tool according to claim 22, wherein the speed change mechanism further includes a switching set value adjusting mechanism which is operated by a user and adjusts a switching set value at which the transmission path is switched between the first power transmission path and the second power transmission path in the state in which the mode switching mechanism is placed in the first transmission mode.

24. The power tool according to claim 21, wherein:
at least one of the first and second clutches comprises a drive side clutch member and a driven side clutch member which are opposed to each other on the first or second rotating shaft, and one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other,
the sliding engagement clutch further includes an elastic member that biases the sliding side clutch member to the power transmission position, and the switching set value is defined by a biasing force of the elastic member, and when a load exceeding the switching set value is applied to the sliding side clutch member, the sliding side clutch member moves from the power transmission position to the power transmission interrupted position against the biasing force of the elastic member, and
the switching set value adjusting mechanism includes an adjusting member for adjusting the biasing force of the elastic member.

25. The power tool according to claim 21, wherein the switching set value can be steplessly adjusted.

26. The power tool according to claim 21, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

* * * * *